United States Patent

Sheth et al.

[11] Patent Number: 5,386,517
[45] Date of Patent: Jan. 31, 1995

[54] DUAL BUS COMMUNICATION SYSTEM CONNECTING MULTIPLE PROCESSORS TO MULTIPLE I/O SUBSYSTEMS HAVING A PLURALITY OF I/O DEVICES WITH VARYING TRANSFER SPEEDS

[75] Inventors: Jayesh V. Sheth, Mission Viejo; Craig W. Harris, Lake Forest; Theodore C. White, Tustin; Kha Nguyen, Anaheim; Chung W. Wong, Dana Point; Richard A. Cowgill, Lake Forest, all of Calif.

[73] Assignee: Unisys Corporation, Blue Bell, Pa.

[21] Appl. No.: 8,962

[22] Filed: Jan. 26, 1993

[51] Int. Cl.[6] .................................................. G06F 5/06
[52] U.S. Cl. .................................. 395/275; 364/240.2; 364/270.6; 364/DIG. 1; 395/500
[58] Field of Search ............... 395/275, 425, 725, 800, 395/500; 364/240, 240.2, 240.8

[56] References Cited

U.S. PATENT DOCUMENTS

| | | | |
|---|---|---|---|
| 4,931,924 | 6/1990 | Kageura | 395/275 |
| 5,263,139 | 11/1993 | Testa et al. | 395/325 |
| 5,265,211 | 11/1993 | Amini et al. | 395/325 |
| 5,276,845 | 1/1994 | Takayama | 395/425 |

Primary Examiner—Thomas C. Lee
Assistant Examiner—Sang Hui Kim
Attorney, Agent, or Firm—Alfred W. Kozak; Mark T. Starr; Stanton D. Weinstein

[57] ABSTRACT

An Input/Output Module (IOM) interfacing multiple computers attached to a dual system bus. The IOM provides an interbus module which interfaces the dual system bus to a sub-requestor bus connecting multiple sub-requestor modules. The sub-requestor modules control a plurality of interface adaptors permitting data transfers to/from a variety of peripherals using different data protocols and clock rates. The requirements for the main host processors and memories in a computer system would be unduly burdensome were it not for the relief from these overhead operations by the input/output module which provides the tailoring of data transfer capability to and from a multiplicity of peripherals having many different types of protocols and clock rates.

12 Claims, 7 Drawing Sheets

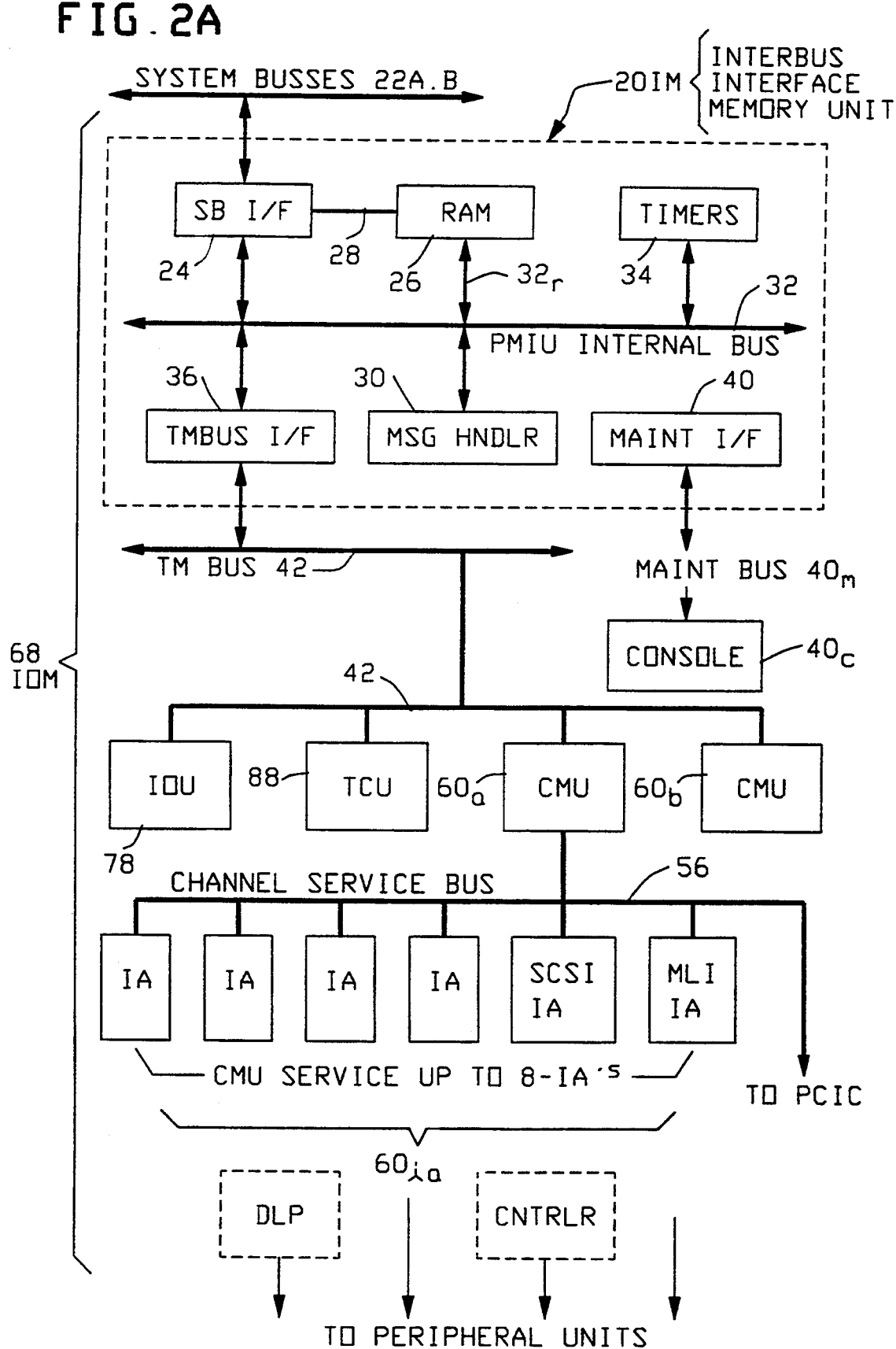

DUAL BUS COMMUNICATION SYSTEM CONNECTING MULTIPLE PROCESSORS TO MULTIPLE I/O SUBSYSTEMS HAVING A PLURALITY OF I/O DEVICES WITH VARYING TRANSFER SPEEDS

FIELD OF THE INVENTION

This disclosure relates to a specialized and modular input/output system which interfaces a central processing module via a dual system bus connecting multiple central processors to multiple numbers of peripheral units.

BACKGROUND OF THE INVENTION

There has been the ever present problem of providing an architecture permitting multiple host processors to efficiently communicate with multiple numbers of peripherals using different protocols. The difficulties are compounded when the host processors operate at different clock frequencies from the connecting I/O subsystems and peripherals and also use different message passing protocols.

The present multiple computer system network bridges the gap of handling normally incompatible digital modules via an architecture which permits efficient interoperability such that a host processor protocol using a single word and a first clock rate can functionally communicate with a modular input/output subsystem using a four word message protocol and a second clock rate with the added capability of communication with a variety of different peripheral units through specialized channel interface adaptors.

The Input/Output Module Subsystem (IOM) described herein relieves the Central Processing Modules (CPM) of I/O functions thus freeing the CPMs to work on higher priority tasks while the IOM provides rapid throughput for data communication and control to various types of peripheral units.

CROSS REFERENCES TO RELATED APPLICATIONS

This disclosure relates to other filed applications on the described system which are included herein by reference and these include: Translator System for Intermodule Message Transfer" filed Feb. 14, 1992 as U.S. Ser. No. 07/837,174 is still pending; and "Dual Bus Interface Unit" filed Oct. 16, 1992 as U.S. Ser. No. 07/963,304 is still pending.

SUMMARY OF THE INVENTION

The modular input/output subsystem of the present invention operates as an interfacing mechanism between multiple numbers of peripheral units, operating under different protocols, and a dual system bus of a multi processor computer system which operates at a different clock rate and protocol from the I/O subsystem.

An interbus memory interface unit (PMIU), Processor Memory Interface Unit also designated as "interbus module", connects to a pair of dual system busses and provides communication from these dual busses to a transfer-message bus (TM Bus) which connects to multiple sets of digital processing modules designated as the input/output unit (IOU), the task control unit (TCU), and channel manager units (CMU) which provide output on a bus (CS Bus) to a channel adapter rack connecting to multiple numbers of peripheral units, each of which may operate on different communication protocols.

The Task Control Unit (TCU) manages events and schedule jobs for the MCP Master Control Program of the Central Processing Modules (CPMs). The TCU selects the next process to be run on the processors within the IOM (Input/Output Module) and also maintains a status record of the tasks being run.

The IOU schedules all I/O jobs using its private queues and does path selection and load balancing. The IOU gathers statistics on each peripheral unit and informs the TCU that an I/O operation is completed.

The CMU provides a connective mechanism to system memory and to multiple interface adaptors (IA). The CMU receives job tasks from the IOU via path queues and returns data to the IOU via Result Queues.

The interbus memory interface unit (PMIU), with its connection to a dual and concurrently operating system of busses, thus permits various resources (central processing module and memory) on the busses to communicate with the multiple numbers of peripheral units in this system. Due to this redundancy, the system provides a full tolerance so that if one system bus should fail or be inoperative, the other system bus can carry and support full communications and data transfer operations.

BRIEF DESCRIPTION OF THE DRAWINGS

FIG. 2A is a diagram illustrating the architecture of the presently described Input/Output Subsystem (IOM);

GENERAL OVERVIEW

Figure 1A:
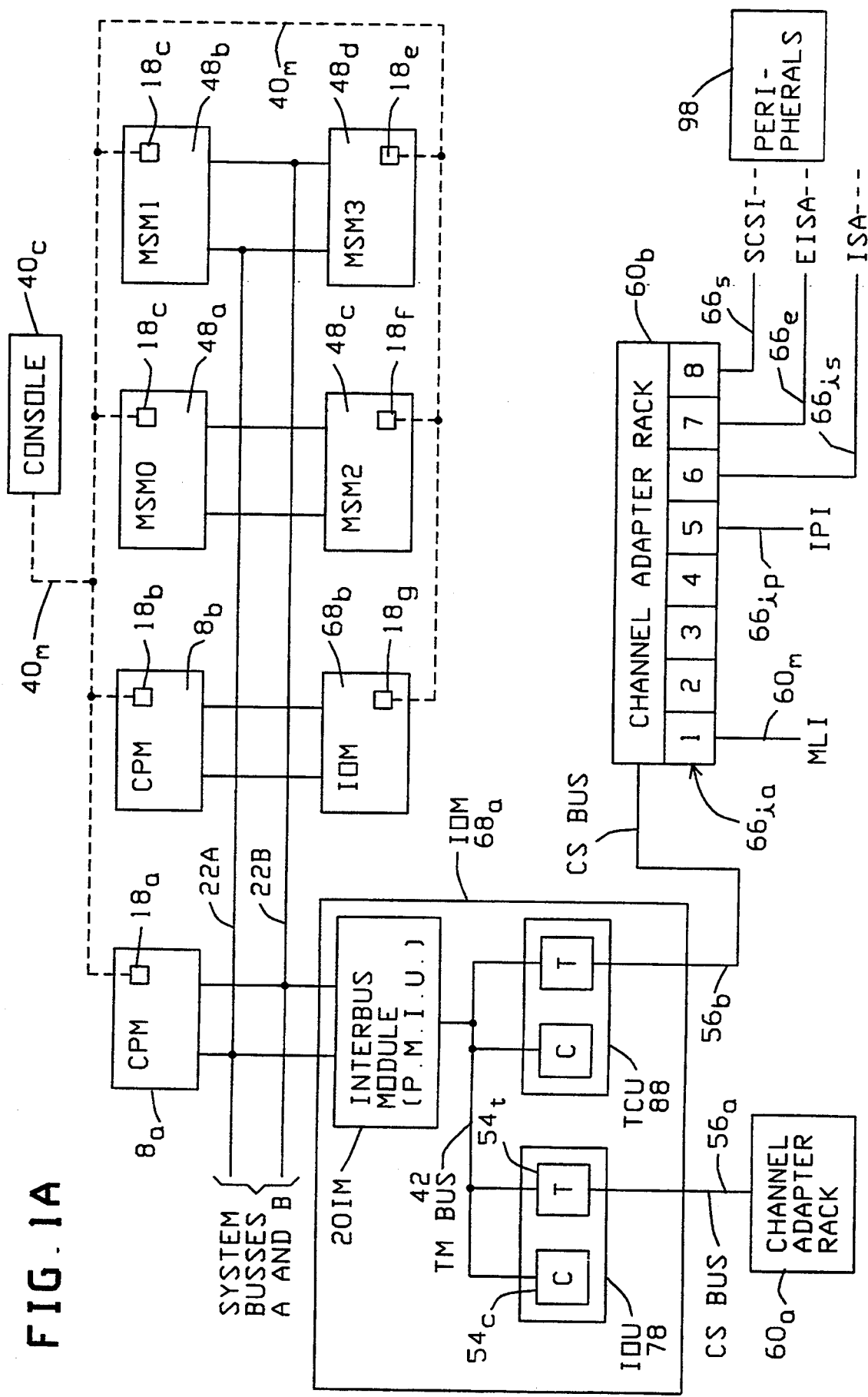
FIG. 1A is an overall system diagram indicating the modular input output subsystem (IOM) as being connected to the dual system busses and various resource modules involved.

FIG. 1A indicates a general overview of the entire system operation of a computer system network designated as the Unisys A-11 system. Dual system busses 22A and 22B are seen to provide dual communication channels between central processing modules 8a and 8b and the other resource modules such as the memory storage modules 48a, 48b, 48c, and 48d in addition to a series of other modules designated as the input/output modules (IOM) 68a and 68b.

Referring to FIG. 1A, there is shown an expanded view of one of the input output modules 68a which indicates that the interbus memory interface unit 20IM (PMIU) is connected to the dual interface busses 22A and 22B. A TM Bus 42 (transfer message bus) connects the interbus memory interface unit 20IM to a series of processing units which are designated as input/output unit (IOU) 78 and the task control unit 88 (TCU). FIG. 2A shows how the TM Bus 42 includes communication to several Channel Manager Units 60 (CMU).

Each of the processing units IOU 78 and TCU 88 are provided with internal microprocessors in I4CT gate arrays which are split up into two blocks designated C for control and T for transmission. I4CT is a gate array chip manufactured by the Semiconductor Division of Unisys Corporation located at 10850 Via Frontera, San Diego, Calif. 92127.

The transmission processors T in units 78 and 88 are respectively seen to have a CS Bus 56a and 56b which connect to a channel adapter rack such as 60a and 60b. The channel adapter rack such as 60b will be indicated as having separate channels which provide different protocol interfaces to various types of peripheral units 98. As seen in FIG. 1A, the various connecting lines would include such busses as a message level interface (MLI) Bus 60m, a small computer systems interface (SCSI) Bus 66s and a ISA Bus 66is and a IPI Bus designated with 66ip. The various lines connect to peripheral devices generally designated by item 98 by means of a set of interface adapters (IA) 60ia which are numbered 1 through 8 in FIG. 1A.

The modular input/output subsystem 68 for the present invention is shown in FIG. 2A. The dual system busses 22A, 22B of the computer network are seen connected to the interbus interface memory unit 20IM (PMIU). Thus the interbus interface memory unit 20IM (Interbus Module) provides an interface between the system busses 22A, 22B and the TM bus 42 shown in FIG. 2A. The TM bus 42 connects to a series of units designated as the input/output unit, IOU 78, the task control unit, TCU 88, and the channel manager units, CMU 60a and 60b. A channel service (CS) bus 56 connects each of the channel manager units 60 to a series of eight interface adapters shown in composite as 60ia. These interface adapters, IA, connect to different types of peripheral devices which may involve different protocol operating characteristics. Additionally, an output channel service line is also provided to a personal computer unit through a personal computer interface control (PCIC).

The interbus interface memory unit module 20IM (PMIU) interfaces to the TM bus 42 and to the system busses 22A, 22B, and also to the maintenance bus 40m in FIG. 2A. The interbus module 20IM executes the commands that are passed to it from its external interfaces. The TM bus 42 has SubRequesters (IOU 78, TCU 88, CMU 60) which initiate system memory 48 (FIG. 1A) accesses, message passing, internal RAM 26 access, timer 34 access and TM bus 42 priority state access. The system busses 22A, 22B enable message passing and timer accesses. The maintenance bus 40m executes state access, processes errors and aids in the state access of the dual port RAM 26. The system busses are seen to be dual passage throughways for simultaneous data transfer operations as described in the cited U.S. Ser. No. 07/963,304 entitled "Dual Bus Interface Unit".

The TM bus 42 carries commands from sub-requestors (IOU 78, TCU 88, CMU 60) which are separated into Read commands and Write commands. The Write commands either write words to the internal RAM26, Write words to the time of day (TOD) timer 34, instruct the PMIU 20IM to execute system bus commands or sets of system bus commands as Read-Modify-Write (RMW) to Main Memory, or they instruct the PMIU 20IM to either send messages onto the TM bus 42 or to process messages internally.

In order to process messages internally, the message actions only need to be executed, as no acknowledge messages need to be sent back if the original message is from the TM bus 42, FIG. 2A, due to the message types that would be received across the TM bus 42 destined for the PMIU 20IM (interbus interface memory unit). The Read commands will either Read the internal RAM 26, the TOD timer in 34 or the free running timer in 34.

The incoming system bus commands to busses 22A and 22B, are separated into memory access commands, message commands, and Read time of day (TOD) commands. These incoming memory access commands to the system busses will attempt to access system memory (48, FIG. 1A) packets for which the master data could be presently residing within the interbus module 20IM. The message commands either instruct the module 20IM to send messages to the TM bus 42 or to process them internally.

In order to process a message command internally, the interbus module (PMIU) 20IM must execute the message action and then build an "acknowledge" message, and send it back to the initiator via the system bus 22A, 22B. The messages received across the system bus, 22A, 22B, which are destined for the PMIU 20IM will need "acknowledge" messages returned because the types of messages received on the system bus 22A, B require acknowledge messages as part of their protocol.

The Maintenance Bus 40m carries commands which will execute state access routines utilizing a shift chain within the interbus interface memory unit 20IM. As much state information on module 20IM as is feasible will be included in the PMIU shift chain. The PMIU internal RAM 26 will be accessible also in this way for system initialization, through the maintenance bus, 40m.

As seen in the block diagram of FIG. 2A, there are certain modules in the interbus interface memory unit (PMIU) 20IM these include the TM bus interface module 36, the system bus interface module 24, the dual port RAM module 26, the Timer module 34, the Message Handling Module 30, and the Maintenance Interface Module 40.

The TM bus interface module 36 of FIG. 2A performs the functions required to handle requests of the Sub-Requestors (CMU, IOU, TCU) on the TM bus 42. These requests are then arbitrated and serviced. Commands are transferred from the TM bus 42 into temporary storage in the RAM 26. Then each command is executed or passed on to another module.

Any data which is being returned back to the TM bus 42 is also handled in the interbus interface memory unit 20IM. Whether the commands are executed or passed on, an internal bus access must first be requested on the PMIU internal bus 32. When the request is granted, the data is transferred either to a system bus command queue, or to a message command queue, or to the timers 34 or to the dual port RAM 26. The TM bus 42 commands are of course only executed if the command is designated as valid.

The system bus interface module 24, described in more detail in FIG. 3 hereinafter, holds the logic necessary to both access the dual system busses 22A, 22B and also to act as an agent on the dual system bus. Outgoing system bus commands from the system bus are queued within the system bus interface module 24. The dual port RAM 26 has addresses which are generated and based on the queued command word in order to access system bus data to be transferred. These addresses are held within the system bus interface module 24. The system bus module 24 must also access the proper words from the RAM 26 and/or the timers 34 to build an "acknowledge" message on-the-fly.

The system bus interface module 24 also includes logic for both system busses 22A, 22B, to concurrently detect system bus parity errors, to detect incoming system bus commands including spying, and to handle dead-lock prevention. When the TM bus 42 brings forth system bus commands, a "Job-Complete" command must be returned to the TM bus interface module 36 after the command is processed.

The system bus interface module 24 handles operations called Read/Modify/Write (RMW) by reading a master word from the system memory 48 while overwriting selected bytes of the RAM 26 in order to handle the merge. The packet involved is then purged back to the system memory 48. All system bus OP codes necessary in order to send out system bus commands are converted from the TM bus 42 command field into the system bus (22A,B) command fields.

In FIG. 2A, the dual port RAM module 26 contains a data storage RAM of 1K×1 Word. The RAM 26 holds byte parity on each word. The 6 data bytes and the tag field are covered by byte parity. There is an internal bus arbiter in the RAM module 26. Internal bus accesses on bus 32 are requested, and then when an internal bus requestor obtains a grant, the requestor may access any resource on the internal bus 32, which could be the dual port RAM 26, the command queues or the timer module 34.

In FIG. 2A the timer module 34 contains the time-of-day counter (TOD) and also a free running counter. The timers are accessed by the system bus interface module 24 or else by the TM bus interface module 36. When read, the data format will be slightly different depending upon the internal bus requestor, as the two requestors will have different data format requirements. When the system clock stops, the TOD timer 34 must continue to count.

The Message Handler Module 30 provides the logic necessary to process the already stored IOM (input-/output module 68) destined messages. Message command queue words are queued within this Message Handler Module 30, and the data is stored in the interbus module's RAM 26. The message data and the command queue words were previously stored by either the system bus interface 24 and/or the TM bus interface 36. These messages are either transferred from the RAM 26 over to the TM bus 42 or else executed within the interbus modules (PMIU) 20IM.

If the command is executed within the (PMIU) interbus module 20IM, then it is possible that an "acknowledge-message" must be returned to the initiating system module. In this particular case, a system bus command (Send Message) is built and queued in the system bus command queue by the interbus module (PMIU) 20IM.

When sending message data out onto the TM bus 42, the data is first trickled into a packet storage buffer located within the interbus module (PMIU) 20IM. Then the message can be returned at the proper timing rate without running into RAM access contention.

For TM bus 42 initiated system bus messages, a "Job-Complete" command must be returned to the TM bus interface module 36 after the command is processed.

The actual sending of messages out onto the TM bus 42 is handled by the TM bus interface module 36.

The maintenance interface module 40 contains shift chain logic and includes part of the RAM access logic and also certain error reporting logic. The RAM address and control must be accessed by shift chains within other modules. Hardware errors in the module 20IM, are accessed by error-signals being sent straight to the maintenance interface module 40.

The interbus memory interface unit, (PMIU) 20IM performs its system memory access in the burst mode. Assuming that there is no contention such as an incoming message or system bus traffic and that there is a data path for one channel manager unit (CMU) 60 only, then the general clock timing for system bus access would be nine clocks for a Read and seven clocks for a Write.

The concept of "Write System Memory" involves the time from the first request by a Sub-Requestor (IOU, TCU, CMU) until the last word of the data packet is actually in the system memory 48.

In regard to the time period for reading from system memory 48, this would involve the time from the TM bus 42 "Read Memory Command" request until the data packet is transmitted across the system bus 22A, 22B and the packet is then transmitted across the TM bus 42 and the last word of the packet is actually residing in the CMU 60. The general number of clock counts in this situation is that for one CMU 60 to "write" to system memory 48 would take 20 clock counts. Similarly for one CMU 60 to "read" from system memory 48, would take 22 clock counts.

Referring to FIG. 1A and FIG. 2A, there is seen the situation of the I/O module or IOM 68 which provides an interface between the dual bus system 22A, 22B connecting central processing modules (CPM) and main system memory 48 (MSM) to a group of Sub-Requestor Modules (IOU, TCU, CMU) which are designated as 78, 88, and 60 respectively.

The I/O subsystem 68 (FIG. 2A) acts to perform the functions of scheduling, initiating and terminating I/O job tasks in their entirety. To a large degree this I/O subsystem reduces the involvement of the host master control program (MCP) in the central processing modules 8a and 8b by permitting normal successful I/O operations with minimum host involvement.

Each interface adaptor $60_{ia}$ (FIG. 2A) provides a physical and a logical interface with a I/O bus such as MLI $60_m$ or SCSI $66_s$ (FIG. 1A). The acronym MLI refers to message level interface, a protocol used in Unisys A-Series Systems. In the case of the message level interface (MLI), the MLI cable connects to I/O bases with their LEMS (line extension modules), Connection Modules and data link processors (DLPs) which are Unisys I/O modules.

The DLPs act as controllers connecting either directly or indirectly to actual peripheral units. The IOM 68 contains a number of units which enable it to perform its various functions. These units include: the interbus memory interface unit, (PMIU) 20IM which provides the dual bus interface to the system memory 48 and central processors 28, (FIG. 1B), the input/output unit, IOU 78, which manages the I/O subsystem, one or more Channel Manager Units (CMU 60) which provide the path via the channel service bus 56 to the interface adapters $60_{ia}$, and the task control unit or TCU 88 which provides the schedules for tasks to be performed. The TCU 88 manages events and schedules Jobs for the master control program in the central processing module, CPM 8.

Functional Operation of Input/Output Module

In the action of writing data to a peripheral unit there are a number of operations which are performed in the IOU 78, the CMU 60 and the Interface Adaptors $60_{ia}$ (IA). These include the following. The cycle of an input/output operation begins when a file is opened on some task executing on this system. At that particular time, the master control program (MCP) creates an IOCB (input/output command block) which will be used for subsequent Read and Write operations. During the course of creating and filling in the IOCB, the master control program (MCP) specifies the device number and allocates a completion event using the services of the TCU 88. When a processing job issues a request to Read or Write, the master control program (MCP) calculates the disk address and the I/O length, then generates a controller command, and finishes filling in the input/output command block IOCB.

The MCP passes a Asynchronous Schedule message containing the IOCB address and a device reference to the IOU 78 via a command designated XFNC. The XFNC operator waits for an "Acknowledge Message" before completing.

The master control program (MCP) then executes an XFNC operator which sends a Wait-On-Event Message over to the TCU 88. The TCU 88 causes the central processor 28 (FIG. 1B) to switch tasks and begin executing a "Ready" task. This XFMC operator will not logically complete until the I/O completion event is caused after the I/O complete occurs.

If a "device counts" table has been installed, then the IOU 78 will update the device counts table.

If the IOU 78 has a caching unit, the IOU executes the caching algorithm which may or may not result in one or more actual I/O operations being requested from the unit. The caching unit is an optional feature.

If the unit 78 is a non-caching unit, and if the Active Count equals the Active Limit, then the IOU 78 puts the input/output command block IOCB into the Unit Queue (UQ) according to a "seek optimization" algorithm; otherwise the IOU 78 places the input/output command block (IOCB) in the appropriate Path Queue (PQ). The IOCB is also placed into a Device Queue and also a Device Active Queue.

When the IOU 78 places an IOCB into an empty Path Queue, it sends a message to the channel manager unit CMU 60 specifying the controller and the number of the bus which the CMU 60 is to use in order to reach the controller.

The CMU 60 notifies the interface adaptor $60_{ia}$ associated with that bus, that an I/O operation is pending for that bus. This is done by sending the IA $60_{ia}$ a Host Service Request (HSR) on the CS bus 56, FIG. 2A.

The interface adaptor, IA $60_{ia}$ requests a command notification packet from the channel manager unit CMU 60 which tells the interface adapter IA as to the controller (such as a Data Link Processor) for which the I/O is destined. The IA $60_{ia}$ then connects to the appropriate controller and requests a command packet for that controller. The CMU 60 sends to the interface adaptor $60_{ia}$, the command information which the IA $60_{ia}$ then passes to the appropriate controller. The interface adaptor IA then disconnects from the controller involved. At some time later, the controller reconnects to the interface adaptor $60_{ia}$ to request data. The interface adaptor $60_{ia}$ then allocates an internal buffer and requests and receives data from the channel manager unit CMU 60.

The interface adaptor $60_{ia}$ sends data to the controller until the buffer is empty or until the controller, such as the data link processor, terminates the data transfer. If the buffer becomes empty while the interface adaptor is sending data to the controller, the interface adaptor IA requests data from the channel manager unit 60 to refill the buffer while the controller remains connected. If the controller terminates the data transfer, the interface adapter $60_{ia}$ will disconnect from the controller.

If, after the controller (DLP) becomes disconnected, the amount of data in the buffer is below a specified threshold, the interface adapter $60_{ia}$ will request more data from the CMU 60 to refill the buffer. The controller will reconnect again at a later time for another data transfer. Eventually the controller reconnects with a final result.

The interface adapter $60_{ia}$ passes the controller "result" to the CMU 60 which places it in the IOCB along with the interface adapters logical result. The CMU 60 formats a result and places that in the IOCB. The CMU 60 then places the IOCB in the Result Queue (RQ) for the bus and, if the queue was empty, notifies the IOU 78 that the queue is now "not empty". The IOU 78 looks at the results from the interface adapter $60_{ia}$ and the result from the CMU 60 to determine if the I/O operation was successful. If the I/O operation was successful, the IOU 78 updates the various statistics arrays.

The IOU 78 then instructs the TCU 88 to cause the I/O completion event specified in the IOCB by sending a message to the TCU 88. The TCU 88 causes the event and schedules the waiting job in the "Ready Queue". Eventually, the now ready task will be reactivated and the XFNC operator will complete, the I/O having now been performed.

If the I/O operation was unsuccessful, the IOU 78 links an IOCB into the Intercept Queue (IQ) and sends a message to the TCU 88 which then causes an interception event.

DESCRIPTION OF PREFERRED EMBODIMENT

Figure 1B:
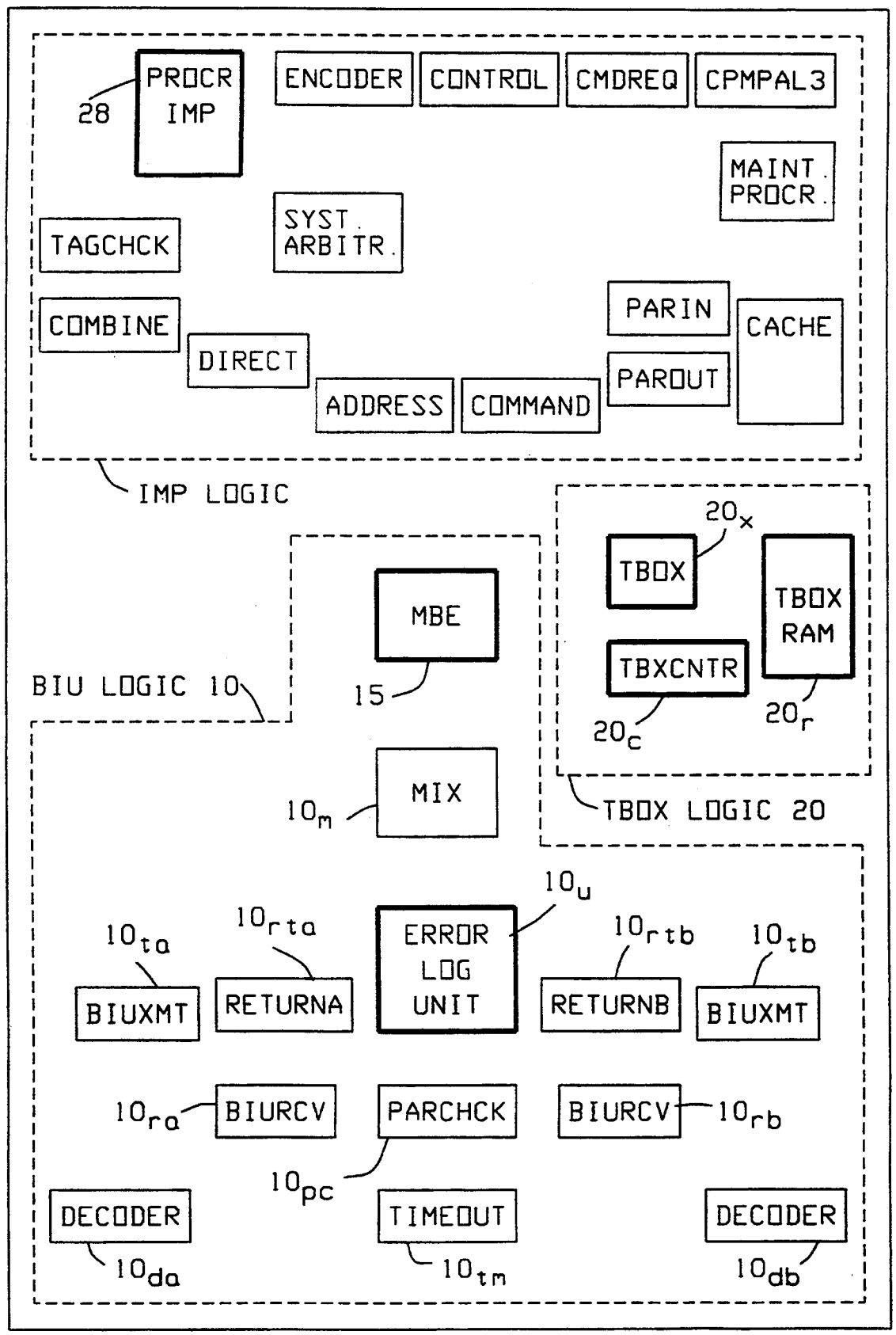
FIG. 1B is a schematic block of the elements in the Central Processing Modules of the host system.

FIG. 1B is a schematic block diagram of the Central Processing Module, CPM 8 which indicates the processor 28 (IMP or Integrated Main Frame Processor) plus other functional blocks which are described in a co-pending application, which is included herein by reference, entitled "Dual Bus Interface Unit" and filed on Oct. 16, 1992 as U.S. Ser. No. 07/963,304.

Referring to FIG. 2A there is seen in more detail the elements of the interbus memory interface unit 20IM (PMIU) of the modular input output system (IOM) 68. The interbus message interface unit 20IM is seen to use the TM Bus 42 to provide communication to the input/output unit 78 (IOU). The IOU 78 (FIG. 1A) then uses the CS Bus 56a to communicate to the channel adapter rack 60. The unit 20 IM also communicates to the Task Control Unit TCU 88 via bus 42.

Referring to FIG. 2A and the interbus message interface unit (interbus module) 20IM (PMIU), it will be seen that the system memory busses 22A and 22B are connected to the system bus interface module 24. The system bus interface module 24 makes use of a RAM Bus 28 to communicate to and from the dual port RAM memory 26. Additionally, there is a two-way bus communication between the system bus interface module 24 and the message handler unit and Timer Module 34 via the internal data bus 32.

Figure 2B:
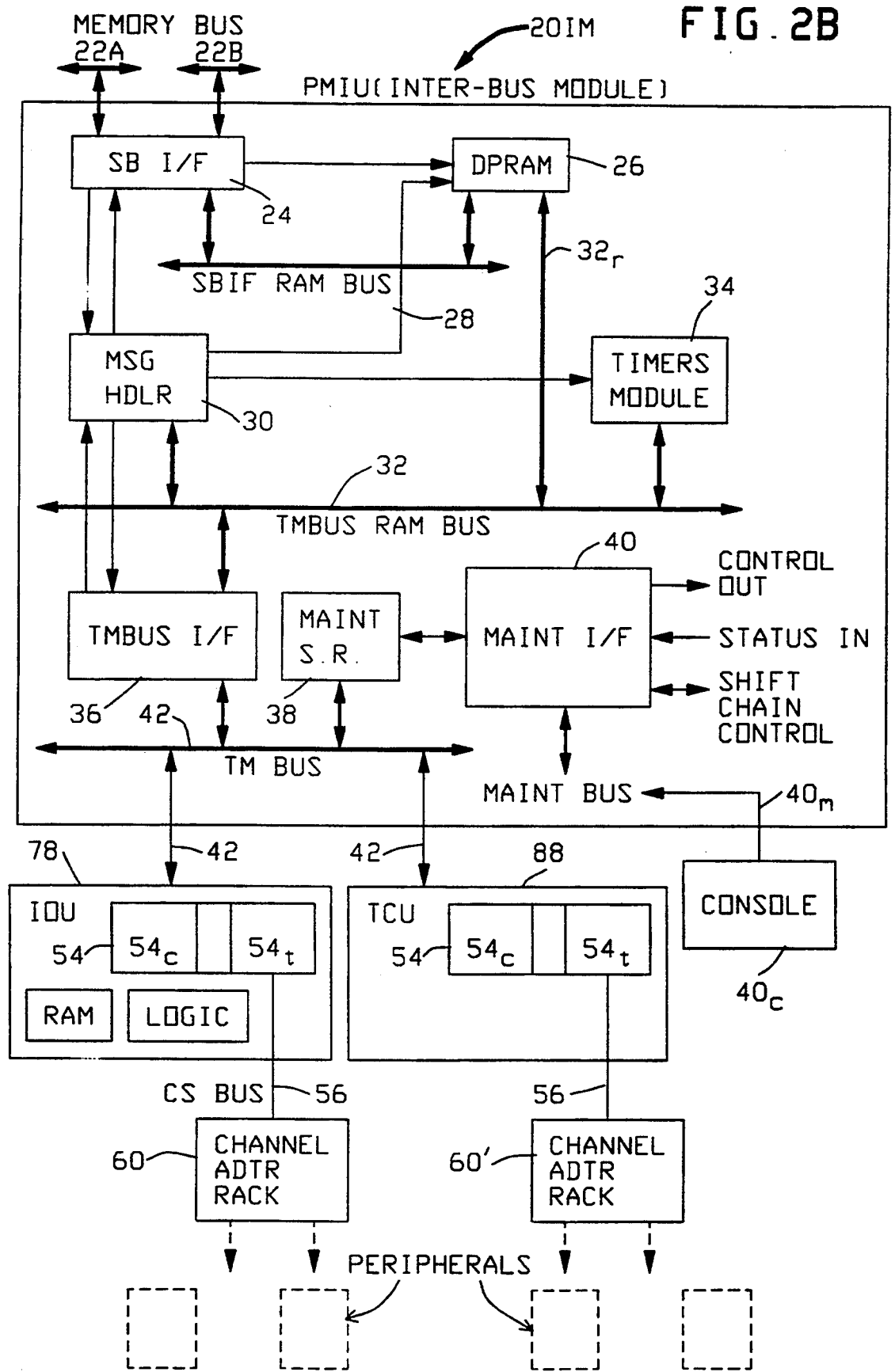
FIG. 2B is a diagram showing the interbus module (PMIU) and its connection to Sub-requestor Modules which handle channel adapters to peripherals.

The message handler unit 30 in FIGS. 2A, 2B, is controlled by the timer circuitry 34 and also provides two-way communication between the TM Bus 42 and TM Bus interface 36, while the leg 32r communicates with the dual port RAM 26.

TM Bus interface 36 has a communication connection to the TM Bus 42 and the internal data bus 32.

Attached to the TM Bus 42 is a maintenance service requestor module 38 which communicates with maintenance interface 40 which further uses a maintenance bus $40_m$ to connect to a console unit 40c, FIG. 1A. In FIG. 1A, the bus $40_m$ connects Maintenance Interface Modules 18a, 18b . . . 18g to the console 40c. The maintenance circuitry and console can simulate the subrequestor to do maintenance testing.

The protocol for the system memory busses 22A and 22B functions on the basis of four words plus parity where each word consists of six bytes (eight bits per byte) plus one byte (4 bits) plus one bit data link unit. Each of the bytes uses byte parity, that is, one parity bit per byte. The TM Bus 42, on the other hand, uses one parity bit per word (56 bits). The interbus message interface unit 20IM will modify these protocols to make the data on the system busses 22A, 22B compatible with the protocol on the TM Bus 42.

Thus the interbus memory interface unit 20IM connects the protocol functions of the input/output system IOM 68 into a compatible protocol for the central processing module (CPM) 8 by using the TM Bus 42 and TM Bus Interface 36. The interbus memory interface unit 20IM (PMIU) acts as a bus master for the TM Bus 42 (transfer message bus). Further, the interbus memory interface unit 20IM handles commands and requests coming from the IOU 78, FIG. 2B, of the incompatible protocol in the processor gate arrays 54c, 54t, FIG. 2B. The memory interface unit 20IM will execute OPs (command operators) from the processors 54t, 54c of FIGS. 2A, 2B.

The TM Bus 42, FIGS. 2A, 2B, operates to accept Reads and Writes so that the bus can function with concurrent operations for the Read Command Bus (RCB) and Write Command Bus (WCB) as it will be discussed hereinafter in connection with FIG. 5.

Another difference between the two types of digital systems involved in the network is that the digital modules within the interbus memory interface unit 20IM and the attached modules to the TM Bus 42 all use ECL logic while, on the other hand, the central processing modules (CPM) 8a and 8b, etc., all use TTL CMOS logic. As observable in FIG. 1A, it will be seen that the interbus memory interface unit 20IM executes jobs for, and/or message transfers to/from the IOU 78, TCU 88, CPM 28, and the Memory Storage Module (MSM) 48.

It should be noted that the architecture provides two of these system memory busses 22A and 22B which allows for redundancy of data transfer and data access. Additionally, the dual busses allow simultaneous data transfer to occur. It should be further indicated as seen in FIG. 1A, that the input/output module (IOM) 68a is serviced by the PMIU 20IM. However, likewise, each of the other IOM modules such as the IOM 68b, also each individually contain an interbus memory interface unit, 20IM (PMIU).

As seen in the block diagram of FIG. 2A, the interbus interface unit 20IM (PMIU) is made a number of intercooperating modules. These include: TM Bus interface module 36, the system memory bus interface 24, the dual port RAM 26, the timer module 34, the message handler module 30, and the maintenance interface module 40.

Interbus Memory Interface Unit Functions (Interbus Module 20IM)

The interbus interface unit (PMIU) 20IM provides an interface to the TM Bus 42, to the system memory bus 22A and 22B and to the maintenance bus $40_m$. The memory interface unit 20IM executes the commands that are passed to it from its external interfaces. For example, the TM Bus Sub-requesters (IOU 78, TCU 88, CMU 60) can initiate system memory accesses, message passing transfers, internal dual port RAM 26 access, timer 34 access, and TM Bus 42 priority state access. The memory busses 22A and 22B can initiate message passing and timer accesses. The maintenance bus $40_m$ can provide information as to access state and can also process errors.

The commands on TM Bus 42, FIG. 2A, are separated into Read commands and Write commands. The Write commands either can write words into the internal dual port RAM 26, or write words to the Time Of Day (TOD) timer 34 or write words to the maintenance Time Of Day (MTOD) timer during the main tenancy mode only, or can instruct the interbus interface unit 20IM to execute memory bus commands or sets of memory bus commands or can instruct the interbus interface unit 20IM to either send messages to TM Bus 42 or to process messages internally.

In order to process messages internally in 20IM, the message actions only need to be executed and there is no "acknowledge" messages which need to be sent back if the original message was sent from the TM Bus 42. This is due to the message type that could be received across TM Bus 42 which is destined to be sent to the interbus interface unit 20IM.

The Read commands are either to read the interbus interface unit's internal RAM 26, or the TOD timer 34 or the Maintenance Time Of Day (MTOD) free running timer located in Timer Circuitry 34, of FIGS. 2A, 2B.

The system memory busses 22A and 22B of FIGS. 1A and 2A have incoming bus commands which are separated into: (a) memory access commands, (b) message commands; (c) Read TOD commands. The incoming memory access commands attempt to access system memory data for which the master data could be residing in the interbus interface unit 20IM.

The message commands (via TM Bus 42 from the IOU, TCU, CMU) either instruct the interbus interface unit 20IM to send messages to the TM Bus 42 or to process them internally. In order to process a message command internally, the interbus interface unit 20IM must execute the message action and then build an "acknowledge" message and send it back to the initiator, unless the message command was required to "write" the I4CT gate array enable mask register in gate array 54 (FIG. 2B).

There are certain messages that are received across the memory busses 22A and 22B and which have a destination to the interbus interface unit 20IM which do need the "acknowledge" messages returned. These are: (a) Write Time of Day, (b) Write I4CT mask register in gate array 54 (FIG. 2B).

There are certain types of messages which are destined for the interbus interface unit 20IM that involve foreign protocols which are not handled by the input- /output module, IOM 68. These include: (i) interbus interface unit fail register Read; (ii) initialize interbus interface unit control store; (iii) Write message interface unit "on" bit; (iv) clear free run counter; (v) Read Time of Day.

The maintenance bus $40_m$, FIG. 2A, has commands which execute state access routines utilizing shift chains via the Module Interface (MI) within the interbus interface unit 20IM. The module interface provides switching and interrupts, and it connects to the maintenance interface 40. The switches are used as mode signals, and interrupts are used to monitor the interbus interface unit 20IM errors.

The maintenance sub-requester module 38, FIG. 2B, contains the maintenance Sub-requester which can execute and check all of the TM Bus commands without need for the IOU, TCU, or CMU.

The TM Bus interface module 36, FIG. 2B, performs a function required to handle the Sub-requestors (IOU, TCU) on the TM Bus 42. The requests are arbitrated and serviced. The commands are transferred to the TM Bus 42 into temporary storage. Each command is then executed or then passed onto another module.

Data returns from Message Handler 30 back to the TM Bus 42 are handled by the TM Bus Interface module 36. Whether the commands are executed, or passed on, an internal bus access on bus 32 must first be requested. When the request is granted, the data is transferred to either the memory bus command queue, to the message command queue, to the timers 34 or the dual port RAM 26. TM Bus commands are only executed if the commands are recognized as valid.

The system memory bus interface module 24 (SBI/F) of FIGS. 2A, 2B holds the logic necessary to both access the dual system memory busses 22A and 22B and also to act as agent on the dual memory system bus. Out going memory bus commands are "queued" within the system memory bus interface module 24. RAM addresses are generated based on the queued command word in order to access memory bus 32 data which is to be transferred. These addresses are maintained within the system bus interface module 24.

The System Memory bus interface module 24 (SBI/F) must also access the correct words from the dual port RAM 26 and/or the Timers 34 in order to build an "acknowledge" message. Also included in the system bus interface module 24 is the logic for both system busses to concurrently detect memory bus parity errors, to detect incoming memory bus commands, including spying, and also to handle deadlock prevention.

The attached Table I entitled "System Bus Operations" shows the sources of command initiation and the resultant message bus interface operations on the System Bus Interface 24, SBI/F (FIG. 2A).

TABLE I

| SYSTEM BUS OPERATIONS | |
|---|---|
| Command Initiation Source | SBIF 24 Operations |
| TM Bus 42 Send Message | Send Message |
| TM Bus 42 Fetch Copy | Read Shared Block |
| TM Bus 42 Store Partial Page | Read Private Block/Purge |
| TM Bus 42 Store Full Page | New Data Overwrite |
| SBIF 24 Command-in RTOD | RCV Read TOD SBIF op. |
| SBIF 24 Message-in WR TOD | RCV Message |
| SBIF 24 Message-in, Rd TOD | RCV Message |
| SBIF 24 Message-in WR Mask | RCV Message |
| Message Handler 30 Return Ack | Send Message |

The interbus interface module 20IM (PMIU) allows information to be acquired from the time of day counter (TOD) and also from a machine time of day counter (MTOD). The TOD scans the actual time of day while the machine TOD gives the running time of the computer.

The interbus interface unit, 20IM, also executes commands for maintenance purposes providing a unique feature where Sub-requestors are used and the interface unit 20IM can do the diagnostic maintenance work without stopping operation of the system.

As seen in FIG. 2B, the console unit 40c can also be considered as a peripheral unit. The console unit 40c and the maintenance bus $40_m$ function to permit the starting of the clocks, to initialize the system, to reset the PC Boards and to control various modes of operation.

For the TM Bus initiated memory bus commands to system busses 22A, 22B, a "Job-Complete" command (JC) must be returned to the TM Bus interface module 36, after the command is processed. The system memory bus interface 24 handles the operations to detect Read/Modify/Write (RMW) operations by reading a master from the system memory 48 (MSM) while overwriting selected bytes of RAM 26 in order to handle the merge. The data packet is then purged back to the system memory 48. All memory bus OP codes necessary in order to send out memory bus commands are converted from the TM Bus command field into memory bus command fields.

The RAM module 26 is a dual ported RAM memory, where the system bus interface 24 uses one port and the other port is used by the TM Bus I/F 36, the Message Handler 30 and the Timer Module 34. The RAM 26 has two banks: (i) for 60 bit data words; and (ii) seven (WE) Write Enables. The RAM contains byte parity on each word. The six data bytes and the tag field and the Corrupt Bit (CB) are covered by byte parity.

The Timer module 34 contains the TOD counter and the machine (MTOD) free running counter. These timers are accessed by the Message Handler Module 30 or by the TM Bus Interface module 36. When read, the data format will be slightly different depending on the type of internal bus requester, as the two requesters have different data format requirements. The Tag value will vary. When the system clock stops, the TOD timer must continue to count. The MTOD counter can be stopped while the system clocks are still running.

The Message Handling Module 30 provides the logic necessary to process the already stored IOM 68 destined messages. The message command queue words are queued within the IOM module 68 and the data is stored within the internal RAM 26. The message data and the command queue words are previously stored by either the system memory bus interface module 24 or the TM Bus Interface 36. The messages are either transferred from the RAM 26 to the TM Bus 42 or executed inside the interbus interface unit 20IM (PMIU).

If a command is executed within the interbus module 20IM, then an "acknowledge-message" must be returned to the initiating system module. In this case, a memory bus command (Send Message) is built and queued in the memory bus command queue (of the system bus interface 24) by this initiating module.

When sending message data out onto the TM Bus 42, the TM Bus logic (in TM Bus Interface 36) is "locked-out" so that the message handler 30 has exclusive control over the dual port RAM 26 and has dominion over the TM Bus 42.

For TM Bus 42 initiated memory bus messages, to system bus 22A, 22B, a "Job-Complete" must be returned to the TM Bus interface module 36 after the command is processed. The actual sending out of messages onto the TM Bus 42 is handled by the TM Bus interface 36.

Referring to FIG. 2B, there is seen a simplified block diagram which is illustrative of the command and data flow involved in the system. FIG. 2B indicates how the interbus module 20IM interfaces between the TM Bus 42 and the system memory busses 22A and 22B. The system memory busses are then seen in FIG. 1A to connect the central processing modules CPM 8 and the memory storage modules MSM 48.

The TM Bus 42 provides connection in FIG. 2B to the input/output unit IOU 78 and the task control unit TCU 88 within which there are seen a processor 54c and processor 55t which connect through the CS Bus 56 to the channel adapter racks 60.

FIG. 2A shows the input/output module IOM 68 which includes the interbus module 20IM, the TM Bus 42, the IOU 78, TCU 88, CMU 60, and a series of interface units IA 60$_{ia}$.

In order to illustrate typical types of operation in this system, the following examples may be helpful.
READ DATA:

This command operation involves a situation where the processors 54c and 54t in FIG. 2B set a "Read Request". Thus the IOU module 78 or the TCU module 88 will send the Read Request to the TM Bus 42 which then will pass it on to the TM Bus interface 36.

The TM Bus interface 36 then returns a "Read Select" signal and takes the Read command from the bus 42. This involves the TM Bus interface 36 sending the command to the TM Bus 42 which then sends the command to the modules 78 and 88. The TM bus 42 also returns the acknowledgement signal to the TM Bus interface 36.

The TM bus interface 36 then requests the READ, via the internal RAM bus 32, after which the internal data RAM bus 32 sends a "Grant Receive" signal back to the TM bus interface 36.

At this point, the required data is Read from the dual port RAM 26 over the RAM bus 32 and into a TM bus register in the TM bus interface 36.

Then the data on the TM bus 42 is then conveyed and passed on to the module units IOU 78 and TCU 88. The data is then received by the processing units 54$_c$ and 54$t$, FIG. 2B.

Another example to illustrate the I/O subsystem functional operation involves the "Write" Operation:
WRITE FULL WORD:

In this situation, the processors in gate array 54, FIG. 2B, in the modules 78 and 88, will set a "Write Request" to the TM Bus 42 which will pass this request on to the TM bus interface 36.

The TM Bus interface 36 will then originate a "Transfer Select" signal to be sent to the TM Bus 42 which is then passed on to the modules 78 and 88 (IOU and TCU).

The TM Bus interface 36 then will accept the Write Request command and the data to be written from the modules 78 and 88 by means of the system bus 42, and this information will be placed in the TM Bus interface 36.

The TM bus interface 36 then checks this data for errors and will then request the internal RAM data bus 32 for access.

The RAMbus 32 will convey a "Bus Grant" signal to the TM Bus interface 36 to indicate that access in now available on the RAM bus 32.

The data to be written, which resides in the TM bus interface 36, is then sent on RAMbus 32 into the dual port RAM 26. Alternatively, the data to be written may be conveyed on the RAM bus 32 over to the Timer Module 34.

A "system" memory "Read" is designated as "Fetch Copy" and is illustrated below:
FETCH COPY:

Here the processors 54 (FIG. 2B) in the unit modules 78 or 88 will set a "Write Request" command and send it on the TM bus 42 into the TM bus interface 36.

The TM bus interface 36 will then return a "Transfer Select" signal to the TM bus 42 and then will take the command and the data address for arbitration in use of the internal RAM bus 32.

At this stage, the TM bus interface 36 waits for a signal saying that the memory bus command queue (in the system memory bus interface 24) is signaled as "not full".

The TM bus interface 36 pushes the "Write Request" command into the system memory bus command queue in SBIF module 24 using the internal RAM bus 32. It also may put the command into the dual port RAM 26.

The system memory bus interface 24 looks at its memory bus command queue and notices that it is "not empty".

The system memory bus interface logic SBIF 24 gets the system memory (MSM 48) address from the RAM 26 where it resides and provides the address where the memory data originally resided in the central processing module 8 of FIG. 1A. The memory address fetch from RAM 26 is then placed in the command queue of the system memory bus interface 24.

The system memory bus interface 24 gets a memory bus command from the dual port RAM 26 for purposes of look-up. This involves the RAM bus 28 connection between the RAM 26 and the system memory bus interface 24.

The system memory bus interface 24 sends a memory bus command out on to one of the system memory busses 22A and 22B to fetch the data from main memory, MSM 48, FIG. 1A.

The system memory bus logic 24 receives the data from the system memory bus 22A or 22B and places it in the RAM 26 by means of using the internal RAM bus 28.

The system memory bus interface 24 operates on its Command Queue (pop) and sends a "Job Complete signal" (JC) to the processors 54. This is done by a signal sent from the interface 24 to the TM bus interface 36 (via the RAM bus 32) and the TM bus 42 then sending the Job Complete signal (JC) to the processors 54 in the modules 78 and 88.

INTERBUS INTERFACE MEMORY UNIT (PMIU), Processor Memory Interface Unit:

The interbus memory interface unit or interbus module, 20IM, in the present embodiment is run at a system clock rate of 16 MH$_z$. It is capable of accessing the system memory 48 as commanded and required by the TM bus commands on 42. Further the PMIU 20IM functions to support incoming system bus commands which involve: Send Message and also Read Time of Day (RTOD). The PMIU 20IM supports the message handling protocol of the central processing module, CPM 8 and also includes the formation and sending of an "acknowledge" message in response to any messages destined to the PMIU 20IM. Additionally, the PMIU 20IM supports four IOM Subrequestors which have been designated as the IOU 78, the TCU 88, the CMU $60_a$ and $60_b$ and the maintenance SubRequestor 38. It will supply all the TM bus related functions required to execute the firmware in these Subrequestors. Additionally, the PMIU 20IM contains a configurable retry counter and a retry limit counter for enabling retries on the system bus 22A, 22B.

The interbus module 20IM (PMIU) decodes command words on both system busses 22A, 22B, concurrently in order to insure that there is correct system bus handling protocol, especially for incoming command detection. While a master (data) is present in the PMIU 20IM, both of the system busses 22A and 22B, must be concurrently spied upon for detection of a memory request for a given packet address. Additionally, the PMIU 20IM permits itself to be tested by means of the maintenance subsystem via 38 and 40.

The PMIU 20IM operates to physically, logically, and electrically interface to the chip sets 54 in the input-/output module IOM 68. The use of the dual port RAM 26 in the PMIU 20IM permits a $1K \times 1$ TM bus word of RAM data to be held for the TM bus protocol. When sending messages out onto the TM bus 42, the data from the PMIU 20IM will go out exactly every other clock for eight clocks.

INPUT/OUTPUT UNIT (IOU 78):

The IOU provides the interface between the master control program (MCP) in the central processing module 8 and the I/O subsystem 68. As seen in FIG. 2B, the IOU uses a set of gate array chips 54c, 54t, a RAM unit and interface logic. The chip must accept a clock which can range from 24 $MH_z$ to 32 $MH_z$ and the chip must be accessible for maintenance to load and examine its control store and local data RAMs. The IOU control store RAM is $16K \times 64$ bits, of which $16K \times 62$ bits are used. The IOU local data RAM is a hardware duplicate of the IOU control store RAM.

The IOU 78 communicates with the PMIU 20IM by means of the 16 $MH_z$ synchronous TM bus 42. The maintenance subsystem 38 and 40 will load the IOU microcode and initialize the local IOU RAM. The maintenance subsystem will also respond to an IOU fatal error signal and IOU low voltage signal. In response to these signals, the maintenance subsystem may stop clocks, Read and/or modify the contents of local memory and also set or reset an IOU fault switch.

The I/O Unit 78 (IOU), FIG. 2B, maintains the status of all devices accessible by the system and provides a software interface to the I/O hardware. It schedules all I/O jobs using its own private queue structures and it is responsible for path selection and load balancing. The IOU is also responsible for managing the Channel Manager Units 60 (CMUs) and for recovery within the subsystem. The IOU gathers statistics on a device basis and, when an I/O completes, causes the appropriate I/O completion event via the TCU 88.

CHANNEL MANAGER UNIT (CMU 60):

The Channel Manager Unit, (CMU) 60 provides the mechanism to interface the system memory data structures (IOCB and data buffers) with a number of interface adapters IA $60_{ia}$, FIG. 2A. Jobs are passed to the CMU 60 from the IOU 78 via "Path Queues" and are returned to the IOU 78 via "Result Queues".

The CMU 60 passes relevant command information to the IAs ($60_{ia}$) and assists in the data transfer operation by mapping between the CS bus 56 words (4-word message) and the E-mode words and maintains system data buffer pointers and counters, manages the (TCW) "task control write" chain operations and inserts "result" information into the IOCBs.

The CMU 60 is also constructed with a I4CT gate array chip which includes a processor. Additionally, the CMU has a RAM and interface logic. The CMU chip can accept a clock ranging from 24 $MH_z$ to 32 $MH_z$ and the chip is accessible for the maintenance subsystem in order to be loaded and to examine the control store in its local data RAM.

The CMU 60 communicates with the interbus module 20IM by means of the 16 $MH_z$ synchronous TM bus 42. Further the CMU communicates with up to eight interface adapters IA $60_{ia}$ by means of the channel service (CS) bus 56.

The maintenance subsystem via 38 and 40 is used to load the CMU microcode and initialize the local CMU memory.

INTERFACE ADAPTERS (IA $60_{ia}$):

The interface adapters (IA), FIGS. 2A, provide the electrical, functional and procedural characteristics necessary to support a single I/O bus. The IA $60_{ia}$ as seen in FIG. 1A can support several different types of I/O bus protocols. These include: MLI or Message Level Interface, the IPI (Interface Protocol Interface) and SCSI (Small Computer Systems Interface). The I/O subsystem 68 (FIG. 2A) operates such that any characteristics unique to each bus type are "masked" from the Master Control Program (MCP) to the maximum extent possible. The IAs are small pluggable cards which connect into the channel service bus 56 and can be added or removed as required to achieve a desired system configuration. Each CMU 60 will be seen to support one channel service bus 56 which can service up to eight IAs.

The basic hardware in the Interface Adapter (IA $60_{ia}$) is a programmable gate array called the IACT. This IACT gate array contains all the logic for the MLI, SCSI, and the IPI interfaces except for the interface drivers and receivers. A 33 $MH_z$ clock is generated internally in order to clock the IACT. Also provided is a control store RAM, a boot PROM, and a local memory RAM.

The present maximum configuration of the I/O subsystem 68 is to support connectivity for up to four channel service (CS) busses 56 via 4 CMUs 60. Each CS bus 56 can connect to a maximum of eight interface adapters IA $60_{ia}$.

CS BUS 56:

The channel service bus is used to connect up to eight interface adapters, IA, to the CMU 60. Additionally there can be provided an interface to a personal computer (PC) which will act as an interface adapter to allow the host system (central processing modules 8) to communicate with a personal computer PC and the peripheral subsystem.

TM bus 42:

The TM bus is a shared internal bus within the I/O module through which the functional units are connected. These functional units includes the interbus module 20IM and the TCU, the IOU, and the CMU. In order to access the system memory 48 or to send a message to other system modules, the IOU 78, the TCU 88, and the CMU 60 will generate requests and transfer data to the interbus module 20IM over the TM bus 42. The general I/O module configuration then will consist of the interbus module (PMIU) 20IM, one or more CMUs 60$_a$ and 60$_b$, one task control unit (TCU 88) and one input/output unit (IOU 78) all connected to a single TM bus 42.

The IOU, TCU and CMU are designated as Sub-Requestors. Each of these sub-requestor units are made of an IOCT gate array plus an accompanying set of microcode running on an external RAM and miscellaneous logic.

Figure 5:
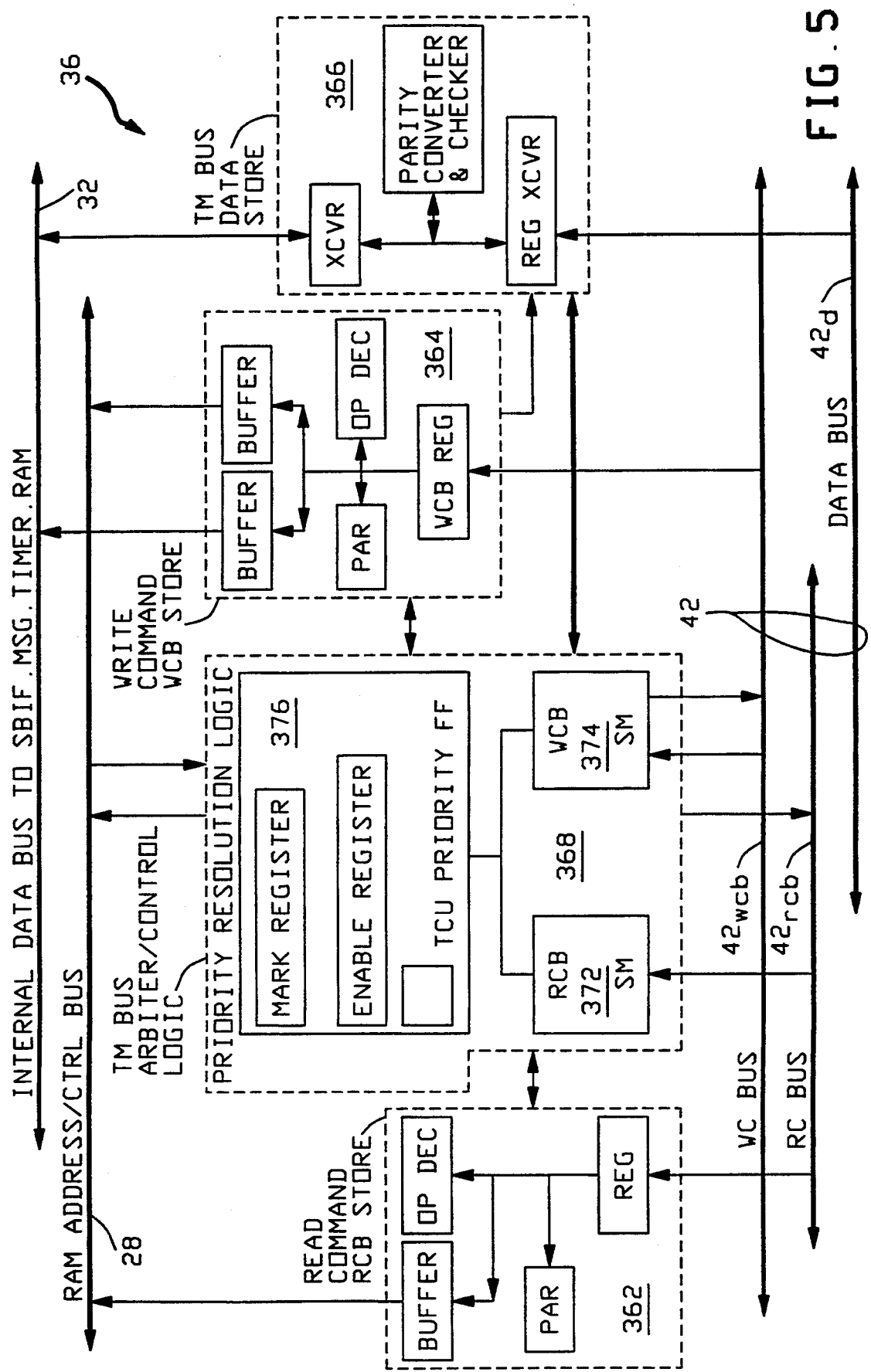
FIG. 5 is a block diagram of the transfer message bus (TM Bus) interface which connects the TM Bus to the RAM bus enabling internal communication within the interbus module (PMIU).

As is indicated in FIG. 5, the TM bus 42 is made up of three busses: Read Command Bus 43$rcb$, Write Command Bus 42$wcb$, and Data Bus 42$d$. These three busses operate at the same clock speed and are synchronized to a 16 MH$_z$ clock. Word parity is maintained on each of three busses.

A TM bus transaction is initiated by a TM bus sub-requestor (IOU, TCU, CMU) sending a command through either the Read command bus or the Write command bus. Internal bus commands are always sent from a TM bus sub-requestor to the interbus module 20IM and direct communication among the TM bus sub-requestors themselves is not supported except through the TM bus 42.

The TM bus supports two sets of logical bus commands: Read Commands and Write Commands. Read commands are sent through the Read command bus 43$rcb$ while Write commands are sent via the Write command bus 42$wcb$. The Read command bus and the Write command bus can operate simultaneously and accept commands from TM bus sub-requestors in the same clock time.

The Read Command Bus provides an interface through an OP code and the interbus module 20IM's RAM 26 address can be sent. A Read command instructs the PMIU 20IM to return a 52-bit data word on the RAM data bus 32 at a later time. Returned data may be a system memory data word, a time-of-day value, or a free-running timer value.

Similar to the Read command bus, the command word transferred on the Write command bus 42$wcb$ contains an OP code and also the PMIU RAM 26 address. To send a Write command to the PMIU 20IM, the TM bus sub-requestor must first raise a request and when selected, transfer the command word on the Write command bus, and the accompanying data on the Data Bus 42$d$. Depending on the command, the accompanying data word may be a system memory data word, a time-of-day value, a Write enable mask, a system memory address, or a destination module identification.

There are several types of Read and Write commands which are effectuated on the TM bus 42. These include the following:

READ COMMANDS:
 (a) Read Data: the PMIU 20IM returns a 52-bit data word located at the specified address in the RAM buffer 26.
 (b) Read Time-of-Day (TOD): the PMIU 20IM returns the current time-of-day value in the time-of-day counter 34 which is maintained in the PMIU 20IM.
 (c) Read Timer: the PMIU 20IM returns the current value of the Run Timer 34 which resides in the PMIU 20IM.

WRITE COMMANDS: The following Write Commands are provided on the TM bus 42:
 (i) Write Full Word: the PMIU 20IM Writes the 52-bit data word received from the data bus 32 to the location in RAM 26 specified in the Write Command.
 (ii) Write Partial Word: the PMIU 20IM Writes the 52-bit data word received from the RAM internal data bus 32 to the RAM location in RAM26 specified in the Write Command.
 (iii) Write Enable: the PMIU 20IM Over-Writes the Write Enable Mask at the RAMbuffer location 26 specified in the Write Command Bus. With the Write enable bits received on the data bus 32. The data field is left intact.
 (iv) FETCH COPY: the PMIU 20IM Reads a four word data page from system memory 48 at the memory address specified on the data bus 32. The data page from the system memory 48 will be stored in the PMIU RAM 26 at the address specified in the Write Command Bus. The Write enable bits for all four words are set to "1".
 (v) STORE FULL PAGE: the four data words from the RAM buffer 26 at the address specified on the Write Command Bus are written into system memory 48 at the address provided on the data bus 32.

The complete set of Write Commands and Read Commands are shown listed in Table II.

TABLE II

| "TM Bus Operations | |
|---|---|
| WCB Command Opcodes | WCB Commands |
| 0 | Write TOD |
| 1 | Write Full Word |
| 2 | Write Partial Word |
| 3 | Write Write Enables |
| 4 | Send Message |
| 5 | Fetch Copy |
| 6 | Store Full Page |
| 7 | Store Partial Page |
| RCB Command Codes | RCB Commands |
| 0 | Read TOD |
| 1 | Read MAM Data |
| 2 | Read TOD |
| 3 | Read MTOD |
| 4 | Read Write Enables |

Figure 3:
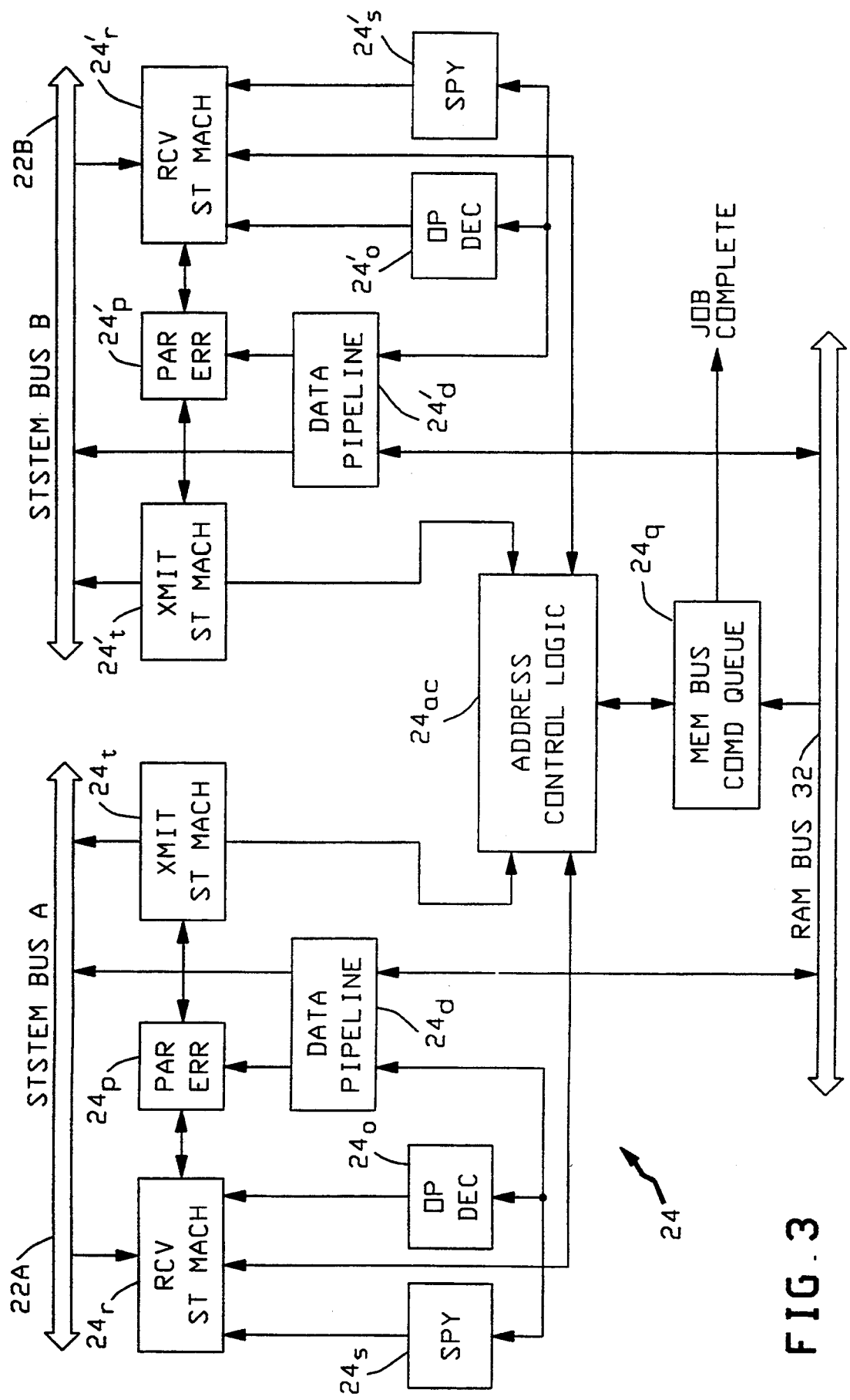
FIG. 3 is a diagram of the system memory bus interface module of the interbus memory interface which connects dual system busses to the I/O subsystem.

SYSTEM BUS INTERFACE MODULE 24:

FIG. 3 is a block diagram of the components of the system memory bus interface module 4. The Memory bus I/F module block diagram illustrates the logic blocks within the Memory bus I/F module. The Memory bus I/F module contains a centralized memory bus command queue 24$_q$ and a centralized address and control logic block 24$_{ac}$. For each of the two system busses there is a data pipeline path 24$_d$, a parity checker 24$_p$, a spy circuit 24$_s$, an op decoder 24$_o$, a transmit state machine 24$_t$, and a receive state machine 24$_r$. The system bus interface module 24 is managed by logic which handles the address and control functions. The address control logic block 24$_{ac}$ manages the command dequeueing, the command field generation, the conditioning of the system bus interface for sending out a command, command execution initiation, RAM address generation, RMW (Read Modify Write), Spy Timing Functions, incoming system bus message commands, incoming system bus Read Time-of-Day (TOD) commands, preconditioned system bus responses, retries, invalid address detection, and Dead-Lock Prevention Management.

MEMORY BUS COMMAND QUEUE:

Commands that the System Memory bus I/F module 24 are to execute, are first entered into the memory bus command queue $24_q$ FIG. 3. These commands will be memory access commands and send message commands. The only thing that the Memory bus I/F will do is to accept incoming memory bus commands one at a time. When the queue is not empty, then the Memory bus I/F will de-queue the first command in the queue and execute it. If the command needs to be retried then it will be retried before the next command in the queue is executed. The retry process will continue until a predetermined retry limit is reached, this condition will be a fatal error. If the queue is full, then a signal will indicate that.

The command at the head of the memory bus queue (in SBIF 24) will be converted from a TM Bus command to a system memory bus command. During a RMW operation, the memory bus command field generated will be a "Private Read" followed by a "Purge". The memory bus command queue will contain the following fields: E-mode address (27 bits) or Destination module ID (4 bits), RAM address (8 bits), TM Bus command (3 bits), TM Bus Sub-requestor ID (3 bits), build acknowledge message Flag (1 bit), Parity (7 bits). The data at the end of the queue, after processing, will be a memory bus command word formatted to go out on the system busses 22A, 22B. The data at the head of the queue will also supply general information about the operation and the RAM address.

When a command is present in the system bus command queue in module 24 and is ready for sending out onto the system bus 22A, 22B, the address control logic $24_{ac}$, FIG. 3, will place it at the head of a two-stage data pipeline on both system busses. One or both of the system busses may be tied up with incoming message traffic or with Read TOD commands. Thus this condition will delay the loading of the pipeline, but as soon as there are free clock cycles, the pipelines will be loaded. Once both pipelines are loaded, the address/control logic $24_{ac}$ causes the system bus request to go out. Whichever bus is granted (either 22A or 22B), that bus system bus control handling logic will process the low level protocol and handle the command by means of the transmit ($24_t$) and/or receive $24_r$ state machines. The RAM addresses (for RAM 26) for data source or destination will come from the address control logic $24_{ac}$. The command word at the head of the queue will contain the RAM packet pointer. This is used to generate the high 8-bits of the RAM address. The lower 2-bits will come from the address/control logic $24_{ac}$ as the pipeline $24_d$ needs filling or emptying in order to satisfy the system bus data transfer phase.

In providing for address generation, there are two special cases: (i) RMW (Read Modify Write) handling and (ii) Fill (acknowledge). When the TM bus 42 command is "Store Partial Page", then a special case of a system bus Read is executed where only certain bytes are over-written in the packet. This is achieved by first reading the "Write Enables" from the next RAM location to be written. Then, only those indicated bytes are over-written.

With byte parity in the RAM 26 (FIG. 4), parity is maintained automatically. The reading of the "Write Enables" in RAM 26, and the writing of the data portion of the next word, can happen on the same clock. This is possible because there are two sets of the following items (a) and (b). One of these is for "Write Enables" and the other one is for the data portion: (a) the lower two address bits, data lines on the internal RAM-data bus 32 and (b) the Write and Read controls. In order to fill the "acknowledge" message, the pipeline $24_d$ is filled from the timers and with canned words in the RAM 26.

During a Read Modify Write (RMW) cycle, a master word group is obtained within the PMIU 20IM and thus needs to be spied on. During these periods, the address control logic $24_{ac}$ will make the system memory address of the master word group available to the spy circuit $24_s$ and also tell the spy circuit when to go active or not.

When an incoming message destined for the system bus interface 24, is present on one of the system bus 22A, 22B, it will be accepted unless the system busses protocol is directed to reject or to put off the incoming command. This is done with a RETRY or PENRDY (peripheral not ready) command. This latter command refers to the peripheral element not ready. When the command is accepted and it is a message command, then the data from that command is stored in the RAM 26 and the packet pointer is passed to the Message Handlers command queue in module 30. If the incoming command is accepted by the system bus interface unit 24 and it is a RTOD command, then the Time-of-Day (TOD) will be obtained from Timer 34, placed in the correct pipeline and then passed out to the available system bus 22A or 22B.

Only one system bus command will actually be accepted or acted on at any one time within the PMIU 20IM. Any other command will be preconditioned to either go "busy" or to set up for a "retry". When the system interface bus module 24 is ready to send out a command, then the system bus 22A, 22B, will be preconditioned in this way to prevent resource contention. When no command from SBIF 24 is being transmitted or is ready to transmit, the system bus protocol State Machine will let the first command in but not the second one. On any tie for contention time, the system bus A will always be selected.

MEMORY BUS ADDRESS AND CONTROL LOGIC BLOCK $24_{ac}$:

The System Memory bus I/F 24 is managed by the address and control (A/C) logic $24_{ac}$. This logic block manages the command dequeueing, the command field generation, the conditioning of the Memory bus I/F for sending out a command, command execution initiation, RAM address generation, RMWs, spy timing functions, incoming memory bus message commands, incoming memory bus read TOD commands, preconditioned memory bus responses, retries, invalid address detection, and dead-lock prevention management.

When an incoming message is present on one of the system busses 22A, 22B, it will be accepted unless that System Memory Bus's protocol SM (State Machine described in U.S. Ser. No. 07/963,304 on Dual Bus Interface Unit) is directed to reject or put off the incoming command (with RETRY or PENRDY respectively). When the command is accepted and it is a message command, then the data from that command is stored in the RAM 26 and the packet pointer is passed to the Message Handler's command queue in module 30. If the incoming command is accepted and is a RTOD command, then the TOD will be obtained, placed in the correct pipeline and passed out to the available system memory bus, 22A or 22B.

Only one system bus command will actually be accepted or active at one time within the (PMIU) interbus module 20IM, the other will be preconditioned to either go busy or to set retry. When the System Memory Bus IF module 24 is executing a command queued in its "out-queue", any inbound OPs would be held off, and the Receive state machine $24_r$ (FIG. 3) would be preconditioned to hold them off to prevent resource contention. When inbound OPs need to be held off, the Receive State Machines $24_r$ would be preconditioned to hold them off. When an inbound OP is being executed, the outbound OPs will not be selected to be executed. There is a "SBIF Job Manager" that selects for execution when an inbound operation or an outbound operation is pending so that only one at a time will be selected. The inbound operations have the highest priority. In the case of two inbound OPs, SBIF-A for bus 22A has the higher priority of the two busses; only one inbound op at a time will be processed, with the other being held off.

"Retries" are managed by the Address Control logic $24_{ac}$ by waiting for the preset duration of a retry interval counter and then re-initiating the command execution cycle. A command will only be retried a certain number of times. Once the retry-limit-counters limit is exceeded, then an error is flagged to the Maintenance I/F module 40. If an inbound OP is detected between retries, then the inbound OP will be handled before starting the next retry.

Each time the System bus I/F 24 completes a transmit cycle, it must verify that an acknowledge occurs. If no acknowledge occurs, then an invalid address is detected and the transmit cycle is retried.

A "dead-lock" could occur if two memory bus agents were sending each-other a message at the same time. In order to prevent the dead-lock, the simultaneous operation on memory bus 22B will be rejected with RETRY while the operation on Bus 22A will continue.

In order to prevent two commands from being processed at the same time on both busses 22A, 22B, a particular scheme has been implemented. The problems involve: (i) prevention of initiating multiple requests; (ii) handling an incoming command while a command that was initiated is still active; (iii) concurrent incoming commands on both busses 22A and 22B; (iv) non-concurrent incoming commands on both busses 22A and 22B; (v) an incoming command on one bus concurrently with a bus grant on the other bus.

A system bus request will be withdrawn on the clock following a fully qualified bus grant. The next bus request will not be generated from the interbus module 20IM until the present command is completed. In this fashion the system will never be the initiator of two commands at the same time. After receiving a grant while initiating a command, the other bus (22A, 22B) will be told to go busy or to cause a retry if an incoming command is detected.

If two commands are detected on the same clock on the same busses (22A, 22B), the command on bus 22B will either go "not ready" or else cause a retry. After receiving a command on only one bus and until the command is fully completed, if the other bus receives a command, it will go "not ready" or cause a retry. In both cases, the PMIU 20IM will not set a request for bus until both busses have no incoming commands present or in process.

If a request is outstanding and then a grant comes in on one bus simultaneously with an inbound command on the other bus, the bus 22B logic will cause a retry.

The protocol handling for the system busses 22A, 22B, is done by means of logic blocks in the system bus interface 24, FIG. 3. There are two sets of logic blocks, one set for the system bus A, 22A, and one for the system bus B, 22B. A two-stage data pipeline $24_d$ aids in satisfying the data transfer timing. In some cases, data will go straight from the RAM 26 to the outboard stage. Other times the data will go to the inboard stage first.

When reading data from the system bus (22A, 22B), the data may also bypass the inboard stage. However parity must be checked when receiving a message in order to set "bus error" if the parity is bad. The sender will retry the command if the "bus error" is set. An OP decoder $24_o$ provides part of the control information required to detect an incoming system bus command. Preconditioned responses also come from this logic block as well as a detection of incoming message commands destined for the system bus interface module 24. If the incoming command has an "invalid OP" then it is ignored by the PMIU 20IM and no error is flagged.

MEMORY BUS PROTOCOL HANDLING LOGIC BLOCKS:

For each of the logic blocks discussed there are two sets; one for Memory bus-A and one for Memory bus-B.

The Transmit State Machine $24_t$, FIG. 3, processes all outgoing System Memory Bus I/F (SBIF) commands. The request is set by the A/C logic, $24_{ac}$. When a grant is received, then the command is processed by the System bus's protocol state machines that received the grant. The grant will only be received on one bus. If the out-going command has a receive portion, as in read data, then it is also processed by the Transmit State Machine $24_t$. The transmit SM also aids in the returning of TOD data.

The Receive State Machine $24_r$ processes all incoming SBIF operations. Incoming OPs will be accepted or rejected depending on the conditions present. If the operation is a message, then it will be partially accepted and then held not ready (NRDY) until the A/C logic $24_{ac}$ decides to process the request and the data is pulled into the RAM 26. If the operation in, is a memory access for which the master is owned, then the command will be rejected by the NRDY (not ready). The A/C logic $24_{ac}$ will not even know about these cases. If the operation is a RTOD command, then the A/C logic will decide when to finish the operation by putting the TOD data in the transmit register and telling the Transmit State Machine SM $24_t$ to drive it out and set data valid on the SBIF 24. The Transmit and Receive State Machines interface directly to the Memory Busses 22A, 22B. These state machines execute the fast part of the protocol (in nanoseconds), and the A/C logic $24_{ac}$ handles the slow part. Once the State Machines are setup and told to execute a command, they operate independently between the two busses and also from the Address Control (A/C) logic, $24_{ac}$.

Figure 4:
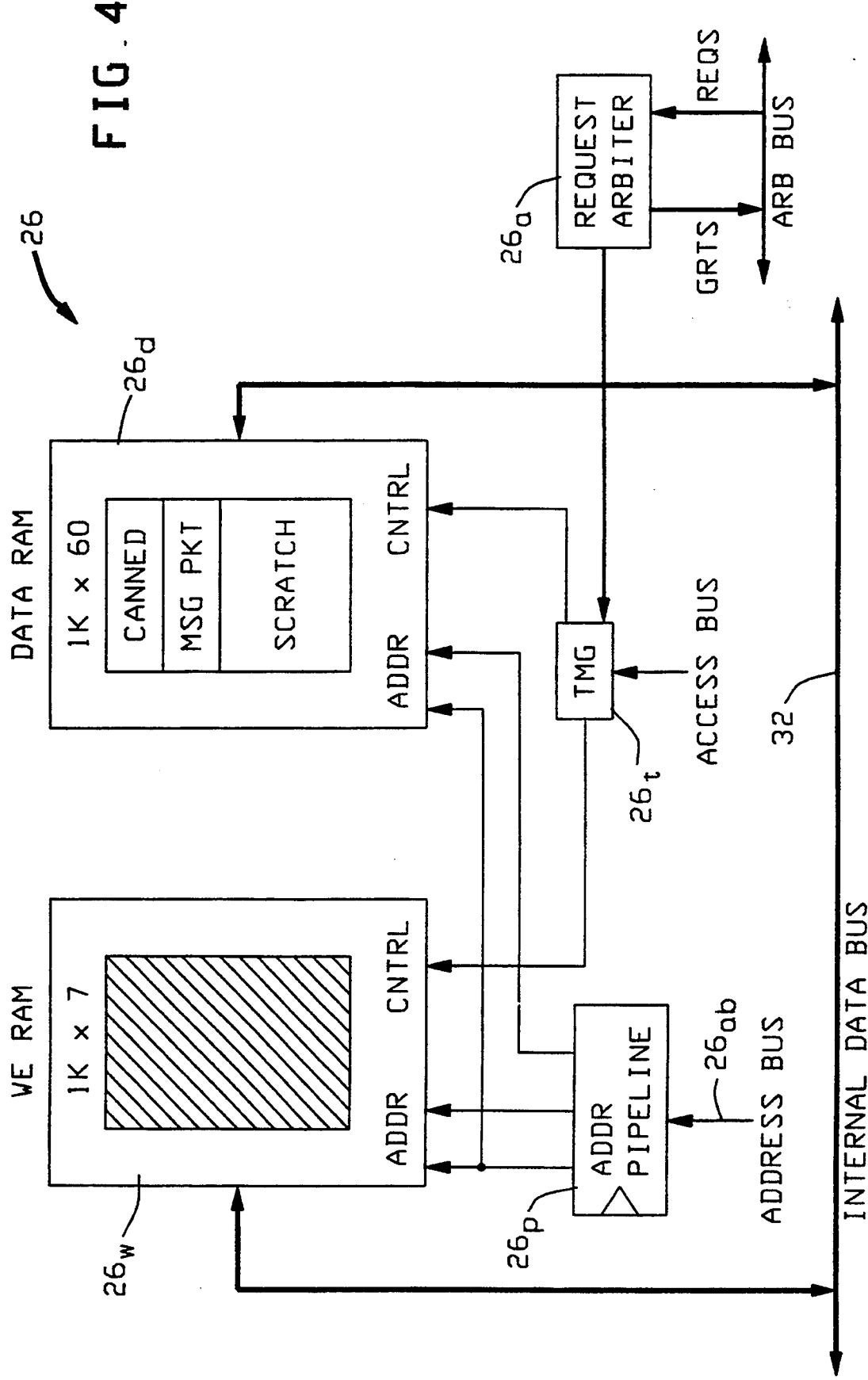
FIG. 4 is a block diagram of the dual port RAM unit of the interbus module (PMIU)

DUAL PORT RAM MODULE 26:

As seen in FIG. 4, the RAM module 26 contains 1K×67-bits static RAM ($26_w$, $26_d$), an address pipeline $26_p$, control timing logic, $26_t$, and an internal bus request arbiter $26_a$. The RAM 26 is physically organized into two banks. The main bank $26_d$ is 60-bits of data: this includes 48-bits of data, 4-bits of tag, 7-bits of parity, and 1-bit of DE (Data Error).

The second bank, $26_d$, is the Write Enable (WE) signals: this involves 7-bits of WE signals. Both RAM banks share the same high 8-bits of address but the lower two bits are different for both banks. The data lines are also different for both banks as are the control lines.

A RAM access is executed by putting a request on the RAM internal data bus 32. When the "grant" comes sometime later, then the appropriate control lines are energized from the requestor. On an internal bus 32 grant, the RAM 26 can be accessed or not accessed. Other data transfers across the internal data bus 32 may be caused instead, such as the loading of the TOD data into the system bus data pipeline, $24_d$, FIG. 3.

The address bus $26_{ab}$ is pipelined. The address by the RAM access cycle is passed one clock before the data is accessed. The address bus is not used for accesses to the other data elements on the internal data bus 32, as for example, accesses to: the system bus command queue, the message handler command queue, the system bus pipeline registers, the TOD timer, or the free running counter.

The internal bus request arbiter $26_a$ grants requests according to a fixed priority arbitration scheme. In general the priorities are organized as follows: the highest priority "1" is given to the requestor from the system bus address control logic $24_{ac}$. The second highest priority, "2", is when the requestor is the message handler logic 30. The third highest priority, "3", is from a requestor on the TM bus 42 for RCB, (Read Command Block). The fourth priority is designated priority "4" and this occurs when the requestor is on the TM bus as WCB, (Write Command Block). The dual port RAM module 26 in FIG. 4, is memory ($26d$) partitioned logically into a sub-requester scratch memory, an area for canned words, and an area for the message data packet storage.

The "scratch pad" area of the RAM 26 is where the data resides when the TM bus requestors on TM Bus 42 specify exactly where the data is to go. When the TM bus command is "Write Full Word" for example, the command includes the 10-bit address which specifies exactly where the data goes. If the command were "Store Full Page", then the top 8-bits would state exactly which packet to send to the RAM memory 26.

The "canned words" in the dual port RAM 26 are loaded by the maintenance shift chain (via maintenance IF 40, FIG. 2A) and used to build the "acknowledge" message command and canned data words. These are generated within the interbus module 20IM and sent out on to the system bus 22A, or 22B.

When messages are received by the interbus module (PMIU) 20IM from across the system busses 22A, 22B, there is no specification as to where the data packet will be placed. There is no requirement that these words will go into the dual ported RAM module 26. However, in order to store up these packets and go on without slowing down the system bus interface logic 24, these packets are put into the RAM 26 under the control of the system bus interface address control logic $24_{ac}$ (FIG. 3).

THE TIMER MODULE 34:

The timer module 34 in FIGS. 2A, 2B is a LCA (Logic Cell Array) which contains two 36-bit counters. Any one of these counters can be written into and read but only one at a time. Basically the timer module contains two timers—one of which is the time-of-day (TOD) timer and the other is the free running (MTOD) timer. Both of these timers count 2.4 microsecond clock pulses. The time-of-day (TOD) timer may be written to and read from the internal data bus 32. The free running timer, MTOD, can only be read on the internal bus 32. The free running counter (MTOD) is reset at system initialization. The time-of-day counter (TOD) must keep counting when the system clock stops. However the free running timer must stop when the system clock stops. When the timers are read, the data transfer must be synchronous. If the counters are read during a 2.4 microsecond clock pulse, the 2.4 microsecond pulse must not be missed in the accumulated count (next read) but can be missed for that read.

MESSAGE HANDLER MODULE 30:

Message Handler Module of the interbus module (PMIU) 20IM FIG. 2B, does not process messages on either the system bus A or B or the TM bus 42, but instead intercepts all messages that are IOM bound (Input/Output Module 68, FIG. 2A). All messages that have a destination module identification (ID) in the interbus module 20IM, will have the message's relevant information queued in the Message Handlers command queue as RAM packet address (8 bits) TM bus sub-requestor ID (3 bits), source system bus Boolean (1 bit), and the source module ID (3 bits).

When the Message Handler's queue is empty, then no action is taken. When the queue is not empty, then the command at the head of the queue is processed. If the queue is full, then that is indicated by means of a signal to the hardware.

To process a message in the queue of the Message Handler 30, the first word of the message is transferred to a message packet storage buffer. The TM bus ID (3 bits) and the action field (4 bits) from the first word are made available to the Message Handler 30. If the TM bus ID does not indicate that the interbus module 20IM (PMIU) is its destination, then the rest of the packet is loaded into the message packet storage and the TM bus interface module 36 is flagged to execute the transfer. If the destination unit identification (ID) does actually indicate the (PMIU) interbus module, 20IM, as destination then the message action is executed. After execution of the message action, an "acknowledge" message command is transferred from the RAM 26 to the system bus command queue, if the source of the command was a system bus. If the source of the command was the TM bus 42, then the WCB (write command block) state machine, in the TM Bus Interface 36, is flagged to set Job Complete, JCMP, into the sub-requestor module.

The I/O subsystem uses "Status Signals", some of which were previously described, to signal certain status conditions. These Status Signals include:

NRDY—Not Ready
PENRDY—Peripheral Element Not Ready
MNDRY—Memory Not Ready
BE—Bus Error
PNRDY—Processor Not Ready
RTRY—Retry Additionally, the system uses several "acknowledgement" signals which are:

PEACK—Acknowledge Peripheral Element Present
MEMACK—Acknowledge—Memory Is Available
TACP—Transfer Acceptance Signal

TM BUS INTERFACE MODULE 36:

Referring to FIG. 5, there is illustrated how the RAM internal data bus 32 and the RAM address control bus 28 connect to the TM Bus Interface Module 36. The TM Bus Interface Module 36 is seen to consist of a Read command bus store 362, a Write command bus store 364, a TM Bus data store 366, and a central TM Bus arbiter/control logic module 368. Connected to the above mentioned modules is the TM Bus 42 which has three bus legs designated as the Write Command (WC Bus) 42wcb, the Read Command Bus (RCB) designated 42rcb, and the Data Bus designated 42$_d$.

RCB STORE 362:

The Read command bus store 362 is made up of a group of elements including a single stage Read command bus register, parity checking logic, command decode logic, and buffers connected to the Ram address control bus 28.

The RCB register REG, FIG. 5, provides storage to load-in a Read Command which contains a 3-bit OP CODE field, a 10-bit PMIU local RAM address field and a word parity bit. After the command is loaded in the register, the command will be decoded and checked for correct word parity. The result of the decoded command and parity check will be communicated to the TM Bus Arbiter/Control block 368 which controls the execution of the command.

If a parity error is detected, the Read Command will be ignored and the RCB register is then made available for accepting another outstanding Read Command. The Subrequestor (IOU, TCU, CMU) that made the request will eventually time out and resend its command. A valid command will be held in the RCB register until it is executed by the TM Bus Arbiter/Control logic 368.

WCB STORE 364:

The Write Command Bus Store of FIG. 5, is made up of several elements which include a single-stage Write Command Bus Register, parity checking logic, a command decoder, and separate buffers to the internal data bus 32 and to the RAM address control bus 28.

The WCB register provides storage to load a Write Command which contains a 3-bit OP CODE field, a 10-bit RAM address field, and a command word parity bit. Since a Write Command also comes with its accompanying data, this WCB register is always used in conjunction with the TM Bus data bus 42$_d$. After a Write Command is loaded into the WCB Register, it will be decoded and checked for correct command parity. If a command parity error is detected, the Write Command will be ignored and the TACP (transfer acceptance) acknowledge signal will not be returned to the Sub-requestor as a result and the Sub-requestor will then resend the Write Command and its accompanying data. Depending on the type of Write Command, the command may be held in the WCB register until it is executed or it may be passed on to some other module within the interbus module 20IM.

For access commands to the RAM 26 (FIGS. 2A, 2B) of the interbus module 20IM, (Write Full Word, Write Partial Word, Write Write Enables) and the Write Time of Day Command, the command will be held in the WCB register until the TM Bus Arbiter/Control Logic 368 can execute it.

For Memory Access Commands (Store Full Page, Store Partial Page, and Fetch Copy) a memory operation control word will be created and enqueued in the System Bus Command Queue in the system bus interface module 24 under the control of the TM Bus Arbiter/Control Logic 368.

For the Send Message Command, the corresponding destination module identification, ID, is stored in the TM Data Store 366. Depending on the decoding result of this destination module ID, the action to this Send Message Command varies. If the destination module is the same as that of the interbus module 20IM, a message command control word is created and enqueued in the Message Command Queue in the Message Handler Module 30. If the command has a different module ID, then a system bus command word is created and enqueued in the system bus command queue in the system bus interface block 24.

TM BUS DATA STORE 366:

The TM Bus Data Store 366 is composed of several elements which include a transceiver-register which consists of a single TM Bus Receive Data Register (TM Receive Register) and a single TM Bus Transmit Data Register (TM Transmit Register), a Buffer for the internal data bus 32, a message packet buffer, and a parity converter and checker.

The TM Receive Register and the TM Transmit Register provide data storage to receive/send data from/to the TM Data Bus 42, FIG. 5. Each of these registers consists of the 52-bit data field, a word parity bit and a data error bit. After a data word is loaded into the TM receive register it is checked for correct word parity. Since parity is maintained as byte parity inside the interbus module 20IM, a word-to-byte parity conversion is done on the data word before it is transferred from the TM Bus Receive Register to the internal data bus 32. For a data word going out to the TM Bus 42, a byte-to-word parity conversion is done before the data word is loaded in the TM Transmit Register.

The Message Packets buffer store in the TM Bus Data Store 366 provides a single four-word message packet buffer for sending messages to Sub-requestors on the TM Bus 42. This message store is pre-filled by the Message Handler 30 at its own rate. Without this pre-filled message buffer, a system bus operation might have to be throttled or delayed since message data would have to be retrieved from the RAM 26 on every other clock.

READ COMMAND BUS STATE MACHINE, RCB-SM 372:

The RCB State Machine 372 provides control to the RCB store 362 and to the data store 366 in order to select a Sub-requestor, to execute the Read Command Bus Protocol, to return the Read data via the TM data bus 42 and to send messages to the TM bus Sub-requestors (IOU, TCU, CMU).

In accepting a Read Command, if the RCB register in block 362 is available and if there are outstanding Read requests on the RCB bus 42rcb, the RCB state machine 372 will select the highest priority Sub-requestor's request and load the Read Command in the RCB register. If the command is not valid or if there is a parity error on the command, the RCB state machine 372 will ignore the command and continue to accept another Read Command from the Read Command Bus 42$_{rcb}$.

In order to execute the Read Command, the interbus module 20IM makes an internal bus 32 access request. Depending on the Read Command, the RCB state machine 372 asserts different control signals upon getting the access grant.

For the Read Data Command, the RCB state machine 372 will enable the RAM Address Buffer in the RCB store 362 to assert appropriate RAM control to Read data and to load it into the TM Bus Transmit Register in block 366. For a Read TOD/Timer Command, the RCB state machine 372 will assert appropriate signals to load the Timer Value in the TM Bus Transmit Register. After loading the TM Bus Transmit Register, the RCB state machine enables the TM bus transmit register buffer and drives the data onto the TM Data Bus $42_d$ with appropriate TM Bus Control Signals.

The RCB state machine 372 of FIG. 5 also operates to send messages to the TM Bus Sub-requestors (IOU, TCU, CMU). After filling up the message packet buffer in block 366, the Message Handler 30 signals the RCB state machine 372. The RCB state machine then transfers the message data from the message buffer to the TM Bus Transmit Register and drives the data of the 4-word message on the TM data bus $42_d$ every other clock. Lower priority Read data return operations can still utilize the TM data bus $42_d$ during alternate "non-message" clocks in order to return Read data.

While returning the Read data to a Sub-requestor or sending a message, the RCB state machine 372 is capable of accepting another Read request on the RCB bus $42_{rcb}$ as long as the RCB register, in block 362, is available.

WRITE COMMAND BUS STATE MACHINE 374:

The WCB State Machine 374 of FIG. 5 provides control to the WCB store 364 and the TM data store 366 in order to select a Write Request, to execute the Write Command Bus Protocol, to perform a RAM Write Access, to pass a system bus command to the system bus interface module 24, or to pass on a message command to the message handler 30.

A Write Command is always accepted in conjunction with its accompanying data on the TM data bus $42_d$. Since sending a message or returning a Read Data on the TM data bus $42_d$ has higher priority than that of receiving a new Write command, the WCB state machine 374 functions to monitor the RCB state machine's 372 usage of the TM data bus $42_d$ before it accepts a new Write Command. When the TM data bus $42_d$ is available (that is to say the RCB state machine 372 is not sending a message or returning data on the TM data bus $42_d$) and if the WCB Register is empty, then the WCB state machine 374 will select the highest priority Sub-requestors Write Command on the WCB Bus $42_{wcb}$ and load the command in the WCB register in block 364, and the accompanying data into the TM bus Receive Data Register in the module 362.

If a parity error is detected on a Write Command, the command will be discarded and there will be no TACP (Transfer Acceptance Signal) asserted over to the Sub-requestor. If a data parity error or a data error bit is detected as being set on the accompanying data word of the Write Command, the WCB state machine's 374 action will vary depending on the Write Command Received.

For a valid command, the WCB state machine 374 has an action which depends on the type of the Write Command. For RAM 26 access commands (Write Full Word, Write Partial Word, Write Write Enables), the WCB state machine 374 generates an access request to the internal bus 32. Upon getting the access grant, the WCB state machine 374 enables the RAM Address Buffer in the WCB store 364 and then asserts the RAM controls and then transfers data from the TM Bus Receive Register in 366 to the RAM 26 and updates the Write Enables for the same word. The TM Bus Receive Register and the WCB Register are then made available for a new command.

For the Write Time of Day Command, and upon getting an access grant, the WCB state machine 374 will assert the appropriate TOD controls to transfer the new TOD value from the TM Bus Receive register into the TOD register in 34, FIG. 2B, via the internal data bus 32. It should be noted that when commands appear on the system bus 22A, 22B, they are in one command format but when these same commands originate in or are placed on the TM bus 42 they are in a converted format. Thus the following will illustrate the differences between the TM Bus Commands and the System Bus Commands.

On the TM Bus 42, the Send Message Command will appear on the system bus as command "Send Message".

On the TM Bus 42 the command "Fetch Copy" will appear on the system bus 22A, 22B, as the command "Read Shared Block".

The command "Store Partial Page" on the TM Bus 42 will appear on the system bus 22A, 22B, as the command "Read Private Block/Purge".

The command on the TM Bus 42 which is "Store Full Page" will appear on the system bus 22A, 22B, as the command "New Data Overwrite".

The system memory bus interface module 24 of the interbus module (PMIU) 20IM interfaces to the system memory busses 22A and 22B. The module 20IM utilizes the system busses to access system memory 48 and for transferring system messages.

As seen in FIG. 2A, the interbus module 20IM connects to the two separate system busses 22A and 22B. The module 20IM will process any incoming commands on both busses concurrently. The processing of the incoming commands require the detection of "self" as the destination. If "self" is determined to be the destination, then the command must be acknowledged and further processed. At the same time, the interbus module 20IM requests the system bus interface 24 (FIG. 2A, 2B) to initiate an outgoing bus interface operation.

The incoming bus interface commands to the interbus module 20IM from the system busses 22A, 22B, may be message commands, read time-of-day commands, or a system memory access request to an address that is stored in the one packet cache (data RAM 26) of the interbus module (PMIU) 20IM. Outgoing commands may be for memory access or a "Send Message".

"Incoming" message commands to the interbus module 20IM, are first acknowledged by the system bus interface 24 and then enqueued in the "incoming" operation queue. The Message Handler module 30 then processes the incoming message queue (INQUEUE). Incoming read time-of-day commands (RTOD) are first acknowledged by the system bus interface 24 and then the TOD is returned to the requesting module. Incoming memory access requests, for which the module (PMIU) 20IM owns that particular address, are rejected causing that requesting module to try again later.

"Outgoing" system bus interface commands are first enqueued in the outgoing operation queue. The system bus interface 24 processes the outgoing operation queue as long as it is not empty.

As seen in FIG. 3, the system bus interface module SBIF 24 is connected to three main busses. These are the system memory bus 22A, the system memory bus 22B, and the dual port RAM data bus 32.

The system bus interface module 24 has the RAM data bus 32 which is used to pass commands and data between the modules on the backplane that communicate with the system bus interface module 24. There are two types of commands which are used. These are (i) memory commands which are E mode address commands, and (ii) non-memory commands which are destination identification commands. The non-memory commands include message commands and the RTOD (Read Time-of Day) system interface command.

The dual port RAM data bus 32 is used to pass data, and to INQUEUE incoming system bus interface command/and data to be executed. Outgoing system bus interface commands are first enqueued in both the dual port RAM 26 and the system bus interface LCA (Logic Cell Array). The address or the destination identification (DID) is enqueued in the dual port RAM 26, FIG. 4, and the other part is enqueued in the LCA which is located in the System Bus I/F 24. Incoming messages have their data packets enqueued in the dual port RAM 26 as data.

When INQUEUEING the "outgoing" system bus interface commands, the part that is queued in the system bus LCA will be indicated as coming from two sources:
 (1) Commands from the TM bus 42 include:
  Build Flag
  TM bus SR ID (SR=Subrequester)
  TM bus CMD
  RAM ADDR
 (2) Commands from the Message Handler 30:
  Build Flag
  PAD (PAD=Pad with zero's)
  TM Bus Command CMD
  PAD These constitute the address control command queue for the interbus module (PMIU) 20IM.

Commands from the TM bus 42 are different from those that are queued by the Message Handler 30 due to operational differences. From the TM bus 42, the commands are generated from the TM bus Sub-requestors (IOU, TCU, CMU) along with the location of data to be transferred. These commands may be memory access commands or message commands. On the other hand, from the Message Handler unit 30, only the "Send Message" is enqueued and that message is generated within the interbus module (PMIU) 20IM. The system bus interface module 24 must build this message from pre-defined RAM locations.

The system bus interface module 24 of the interbus module (PMIU) 20IM uses the dual port RAM 26 for queue storage, for RAM constants and for look-up tables.

The message packet queue is called the INQUEUE. When "Send Message" operations are accepted coming in off of one of the system busses 22A, 22B, the packet written into the queue is pushed. When the queue is not empty, the Message Handler 30 will process the queue.

The System Bus (SB) command queue is called the OUT QUEUE. When an outbound system bus interface command is to be initiated, it is written into the queue and the queue is pushed. When the queue is not empty it will be processed by the system bus interface module 24, FIG. 3.

When the (PMIU) interbus module 20IM initiates a system bus interface "Send Message Command", the "acknowledge" message packet and the MID register (Message Identification Register) are first initialized by the Message Handler 30 and then the command is pushed onto an out-OP-queue. The packet that is sent out to the system bus interface 24 is taken from this acknowledge packet storage.

When the TM bus 42 interface 36 INQUEUES an operation to be sent out on the system bus interface 24, the TM bus command on bus 42 is translated into a system bus interface command by an OP code look-up table in the system bus interface 24. Once an operation is initiated, a status of successful completions will occur if the system bus interface 24 has executed successfully with no problems. If during the execution of an operation, either a system bus interface retry condition or a system bus interface time-out is detected, the operation will be retried and the retry counter will increment. If, after initiation of an outgoing command, an Invalid Address Error is detected, then the system bus interface operation will be aborted and the present queue position will be skipped and the "Job Complete" signal will not be sent. Also when the Retry Limit (RTLIMIT) is reached, the command will be aborted, the present queue position will be skipped, and "Job Complete" will not be sent. Only 256 retries can be executed in a single operation action before the command cycle is timed-out.

The system bus interface module 24 has a Transmit State Machine $24_t$, FIG. 3, which is implemented in a single programmable array logic unit PLUS405. There is one state machine for the system bus 22A and one state machine for the system bus 22B, as seen in FIG. 3.

Additionally, the system bus interface module 24 has a Receive state machine $24_r$ which is used to handle the operational management of inbound commands and messages.

The system bus interface module 24 contains two LCAs (Logic Cell Arrays). These are provided by the XILINX 3042-PG84-100. The first system bus LCA contains the address generation logic for all the fields which are mapped into the RAM 26. This LCA contains also the additional logic necessary to maintain the IN QUEUE and the OUT QUEUE as well as the JOB COMPLETION generation signal.

The second LCA in the system bus interface module 34 contains the "retry" limit logic, the retry wait interval logic, the INQUEUE and the OUT QUEUE status, the access error logic, and the system bus interface time-out logic.

Described herein has been an Input/Output Subsystem which cooperates with a multiple host computers designated as CPM's or Central Processing Modules.

The I/O subsystem provides an interbus module (PMIU) 20IM which interfaces the dual system busses of the host computers to a TM Bus 42 supporting Sub-requestor Modules (IOU 78, TCU 88, CMU 60) which can communicate and control data and message transfers from a plurality of peripherals attached to Interface Adapters $60_{ia}$ (also called Channel Adapters. These subrequesters provide the operations and overhead functions which relieve the processors and memories (in the Central Processing Modules) from burdensome overhead operations and any need for selecting specialized protocols and clock rates for multiple groups of differently operating peripherals. Thus a variety of peripherals using different communication protocol can interrelate to the multiple host system which has a clock rate and word protocol different from that used in the I/O Subsystem.

Although one preferred embodiment of the I/O Subsystem is described, other embodiments may still be encompassed by the invention according to the following claims.

What is claimed is:

1. A modular input/output subsystem supporting a main host computer having a main memory via dual system busses and providing specialized protocol communication lines to a plurality of different peripheral devices, via a plurality of interface adapter means, said subsystem comprising:
- (a) a dual system bus means for connecting a main host computer and main memory to an interbus interface memory unit means (20IM, PMIU) holding a cache memory unit (RAM26) which reduces the need to access said main memory by a group of subrequestor unit means;
- (b) said interbus interface memory unit means (PMIU) providing an interface between said dual system bus means and said group of subrequestor unit means and operating at a first clock rate;
- (c) transfer message subrequestor bus means (42) operating at said first clock rate and connecting said group of subrequestor unit means;
- (d) each said group of subrequestor unit means operating at a range of different clock rates and relieving said main host computer of operating system I/O tasks, including:
  - (d1) means to communicate via said interbus interface memory unit means to said main host computer via said interbus interface memory unit means for notifying said host of tasks to be run and the completion thereof;
  - (d2) means to schedule, initiate and terminate I/O job tasks for enabling data transfers to/from each of said plurality of peripheral devices via each of a plurality interface adapter means (60$_{ia}$);
- (e) each of said plurality of interface adapter means providing a compatible protocol and clock rate applicable to its connecting peripheral device.

2. The subsystem of claim 1 wherein each of said group of subrequestor unit means includes:
- (a) an Input/Output Unit (IOU) for receiving a job schedule message and peripheral device identification from said host computer, said IOU including:
  - (a1) means to queue said job schedule message and select a channel manager unit (CMU to execute data transfers to/from a selected peripheral device;
  - (a2) means to register the status of all peripheral devices accessible to the dual system bus means;
- (b) a plurality of channel manger unit means (CMU) providing communication to each of a plurality of said peripheral devices via an associated interface adapter means including;
  - (b1) means to receive and execute job tasks from said Input/Output Unit (IOU);
  - (b2) means to signal said IOU as to the status of job task completion or incompletion.

3. The subsystem of claim 2 wherein each said group of subrequestor unit means includes:
- (a) a task control unit (TCU) for registering job tasks ready to be executed and including:
  - (a1) means to signal said main host computer as to the selection priority of the command program to be executed;
  - (a2) means to receive the selected command program from said main host computer for transfer to said Input/Output Unit (IOU).

4. The subsystem of claim 2 wherein each said channel manager unit means (CMU) includes:
- (a) channel service bus means for data transfer to/from each of a plurality of said interface adapter means.

5. The subsystem of claim 2 wherein each said channel manager unit means further includes:
- (a1) means to receive job command tasks and data from said Input/Output Unit and to return task result data to said Input/Output Unit;
- (a2) means to convert the data protocol and clock rate from said interbus interface memory unit means for compatibility to a selected peripheral device;
- (a3) means to transmit I/O commands to a selected interface adapter means.

6. The subsystem of claim 2 wherein said interbus interface memory unit means (PMIU) includes:
- (a) means to interface said dual system bus means (22A, 22B) to said transfer message subrequestor bus means (TMbus 42) including:
  - (a1) means to translate the data protocol and clock rate of said transfer message subrequestor bus means for compatibility with the data protocol of said dual system bus means;
  - (a2) means to pass messages and commands between said dual system bus means (22A, 22B); and said transfer message subrequestor bus means (42);
- (b) said transfer message subrequestor bus means connecting said group of subrequestor unit means to said interbus interface memory unit means and wherein said subrequestor bus means operates on a different data protocol from said dual system bus means.

7. A modular input/output subsystem supporting a plurality of host computer each having a processor and main memory and communicating via dual system busses communication lines to a plurality of groups of different peripheral devices, said subsystem comprising:
- (a) a dual system bus means (22A, B) including a first and second system bus connecting said host computer (CPM) to an interbus interface memory unit means;
- (b) said interbus interface memory unit means (20IM) connecting said dual system bus means to a transfer message subrequestor bus means (TMbus 42) and including:
  - (b1) means to enable communication between said dual system bus means and a group of subrequestor unit means (IOU, TCU, CMU) including:
  - (b1a) means to translate the data protocol and clock rate of said group of subrequestor unit means to/from the data protocol and clock rate of said dual system bus means;
- (c) said transfer message subrequestor bus means(TM bus 42) for enabling communication between said group of subrequestor unit means and said interbus interface memory unit means;
- (d) said group of subrequestor unit means for relieving said plurality of host computers of I/O overhead operations including:
  - (d1) first means (IOU 78) for scheduling and keeping track of input/output job tasks;
  - (d2) second means (TCU 88) responsive to said first means for selecting which host computer will execute a selected I/O program;
  - (d3) third means (CMU 60) for receiving I/O job tasks from said first means for transmittal to interface adapter means;
- (e) said interface adapter means (60$_{ia}$) including a plurality of interface adapters wherein each interface adapter includes:

(e1) specialized protocol circuitry for compatible data transfer to/from a particular type of peripheral device.

8. The subsystem of claim 7 wherein said interbus interface memory unit means (20IM) further includes:
   (a) maintenance means for exercising and checking said interbus interface memory unit means by emulating commands from said group of subrequestor unit means.

9. The I/O subsystem of claim 1 wherein the major operation time execution of said I/O job tasks is provided by said subrequestor module means (78, 88, 60) to relieve the overhead tasks on said plurality of host computers.

10. A hierarchical input/output subsystem (68) for relieving communication overhead in a plurality of host processors with main memory servicing multiple numbers of peripheral units having different protocols and clock operating rates said subsystem comprising:
   (a) an interbus interface module means (20IM) connecting dual system busses operating concurrently in parallel to a transfer message bus (42) communicating with a plurality of subrequestor units;
   (b) each (22A, 22B) of said dual system busses facilitating concurrent and parallel data transfers between one or more main host processors having main memory means and said interbus interface module means (20IM);
   (c) said transfer message bus (42) connecting said plurality of subrequestor units to said interbus interface module means (20IM) and operating at a first clock rate which is the same as the clock rate on said dual system busses;
   (d) said plurality of subrequestor units including:
      (d1) means to schedule, initiate and terminate data transfer job tasks between each of a plurality of channel manager units (CMU 60) and said interbus interface module (20IM) thus relieving said main host processors of operating system I/O execution; and including:
         (d1a) said plurality of channel manager units for communicating with each of a plurality of interface adapters at a range of clock rates different from said first clock rate;
   (e) said plurality of interface adapters each of which communicates with an associated peripheral unit and is tailored to match the protocol and clock rate required by the associated peripheral unit.

11. The I/O subsystem of claim 10 wherein said first clock rate is 16 MH$_z$ and each said channel manager units are settable to operating clock rates in the range of 24–32 MH$_z$.

12. The I/O subsystem of claim 10 wherein said interbus interface module means (20IM) includes:
   (a) maintenance interface means connected to a diagnostic console means;
   (b) said diagnostic console means for emulating said subrequestor units for checking operation of said I/O subsystem.

* * * * *